US009201694B2

(12) United States Patent
Shimamura

(10) Patent No.: US 9,201,694 B2
(45) Date of Patent: Dec. 1, 2015

(54) JOB MANAGEMENT APPARATUS AND JOB MANAGEMENT METHOD

(71) Applicant: FUJITSU LIMITED, Kawasaki-shi (JP)

(72) Inventor: Kaoru Shimamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 299 days.

(21) Appl. No.: 13/760,119

(22) Filed: Feb. 6, 2013

(65) Prior Publication Data

US 2013/0152089 A1 Jun. 13, 2013

Related U.S. Application Data

(63) Continuation of application No. PCT/JP2010/063534, filed on Aug. 10, 2010.

(51) Int. Cl.
*G06F 9/46* (2006.01)
*G06F 9/50* (2006.01)
*G06F 15/173* (2006.01)

(52) U.S. Cl.
CPC ............... *G06F 9/50* (2013.01); *G06F 9/5005* (2013.01); *G06F 9/5027* (2013.01); *G06F 9/5066* (2013.01); *G06F 15/17381* (2013.01)

(58) Field of Classification Search
CPC G06F 9/5005; G06F 9/5066; G06F 15/17381
See application file for complete search history.

(56) References Cited

U.S. PATENT DOCUMENTS 5,264,840 A * 11/1993 Wells et al. .................... 345/599
5,903,888 A *  5/1999 Cohen et al.

(Continued)

FOREIGN PATENT DOCUMENTS

JP H06-089262 A 3/1994
JP 09-198358 A 7/1997

(Continued)

OTHER PUBLICATIONS

Aridor, Y., Domany, T., Goldshmidt, O, Shmueli, E., Morera, J., and Stockmeyer, L. 2004. "Multi-Toroidal Interconnects: Using Additional Communication Links to Improve Utilization of Parallel Computers". In Pro. 10th Workshop on Job Scheduling SAtrategies for Parallel Processing, New York.*
J. P. Hayes and T. Mudge, "Hypercube supercomputers," Prm. IEEE, v. 77, Dec. 1989, pp. 1829-1841.*

(Continued)

*Primary Examiner* — Van Nguyen
*Assistant Examiner* — Jacob Dascomb
(74) *Attorney, Agent, or Firm* — Fujitsu Patent Center

(57) ABSTRACT

A job management apparatus that searches for an available node to which a job is allocatable in an n-dimensional mesh-connected or n-dimensional torus-connected computer network, includes: a one-dimensional search information generating unit that generates one-dimensional search information related to one dimension of n dimensions, which includes a plurality of bits and which indicates, using one-bit information, whether or not the job is allocatable for each of computation nodes belonging to the one dimension; a search information generating unit that generates a search mask pattern with as many bits as corresponds to the plurality of bits, which includes consecutive bits being set to a preset value and corresponding to a size required by the job in the one dimension; and an available node searching unit that searches for the available node by performing, for the one dimension, a preset logic operation with the one-dimensional search information and the search mask pattern.

6 Claims, 16 Drawing Sheets

(56) References Cited

U.S. PATENT DOCUMENTS

| | | | |
|---|---|---|---|
| 8,429,664 B2* | 4/2013 | Ajima et al. | 718/104 |
| 2005/0235286 A1* | 10/2005 | Ballew et al. | 718/100 |
| 2006/0101104 A1 | 5/2006 | Bhanot et al. | |

FOREIGN PATENT DOCUMENTS

| | | |
|---|---|---|
| JP | 2005-310139 A | 11/2005 |
| JP | 2007-206986 | 8/2007 |
| JP | 2007-206987 A | 8/2007 |
| JP | 2008-516346 A | 5/2008 |

OTHER PUBLICATIONS

H. Y. Youn, H. Choo. and S.M. Yoo, "Dynamic task scheduling and allocation for 3D torus multicomputer systems." Int'l Conf. on Parallel Processing. III-199-206, Aug. 1996.*

Notification of Transmittal of Translation of The International Preliminary Report on Patentability (Form PCT/IB/338, Form PCT/IB/373 & Form PCT/ISA/237), International Application No. PCT/JP2010/063534, 6 pages, dated Mar. 21, 2013.

International Search Report, mailed in connection with PCT/JP2010/063534 and mailed Nov. 16, 2010.

* cited by examiner

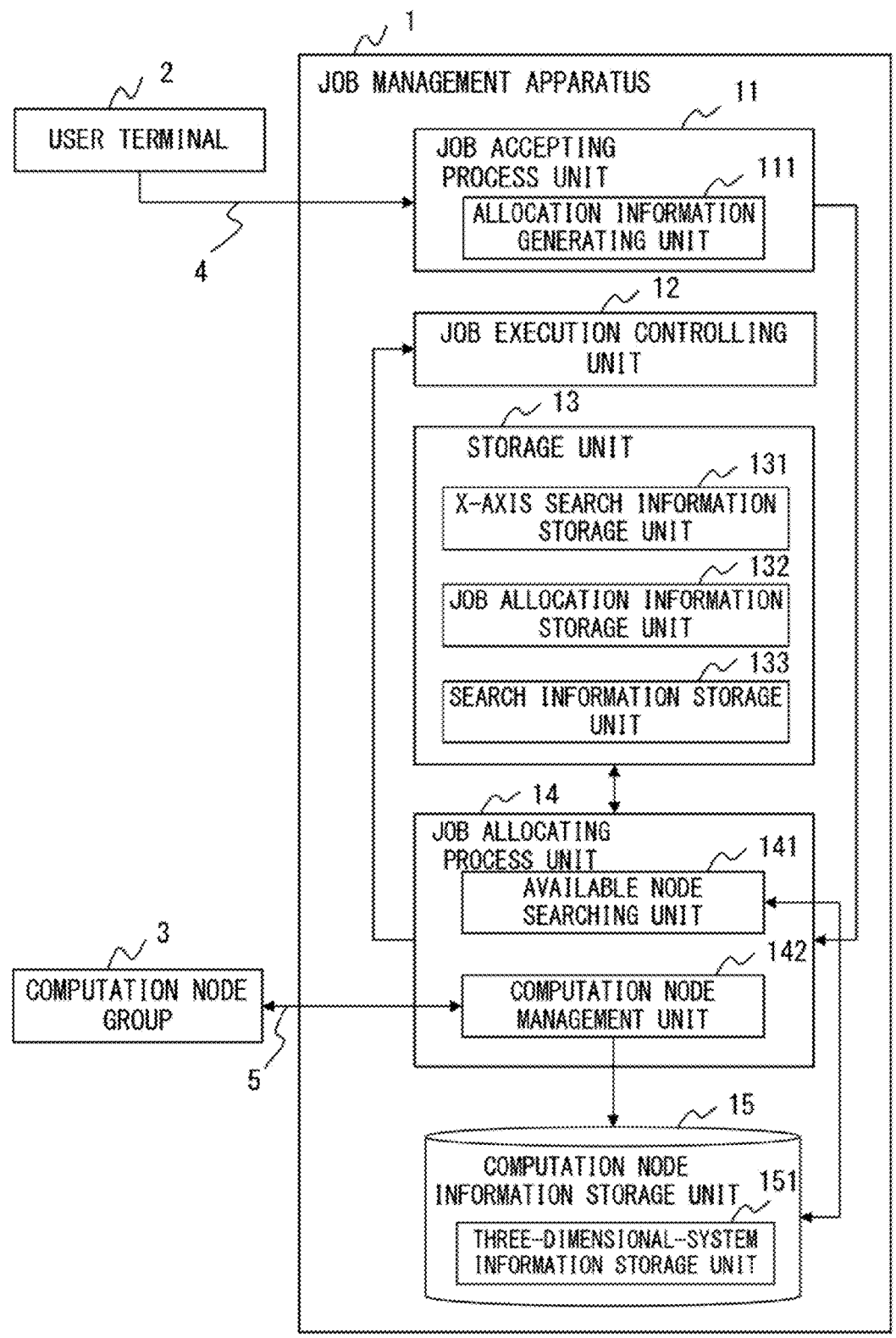
F I G. 1

FIG. 3A

```
unsigned long nobes[systemX][systemY][systemZ];
```
151'

FIG. 3B

```
unsigned long nobes_x[systemY][systemZ];
```
131'

FIG. 3C

```
struct job_info{
        unsigned long position_x;  //JOB START COORDINATE(x)
        unsigned long position_y;  //JOB START COORDINATE(y)
        unsigned long position_z;  //JOB START COORDINATE(z)
        unsigned long shape_x;     //JOB SHAPE(x)
        unsigned long shape_y;     //JOB SHAPE(y)
        unsigned long shape_z;     //JOB SHAPE(z)
        bool          flag;        //ALLOCATABLE FLAG
}
```
132'

FIG. 3D

```
struct search_info{
        unsigned long position_x;  //JOB START COORDINATE(x)
        unsigned long position_y;  //JOB START COORDINATE(y)
        unsigned long position_z;  //JOB START COORDINATE(z)
        unsigned long shape_x;     //JOB SHAPE(x)
        unsigned long shape_y;     //JOB SHAPE(y)
        unsigned long shape_z;     //JOB SHAPE(z)
        unsigned long mask;        //SEARCH MASK PATTERN
        int           shift_all;   //TOTAL NUMBER OF SHIFTS
        int           shift;       //NUMBER OF SHIFTS
}
```
133'

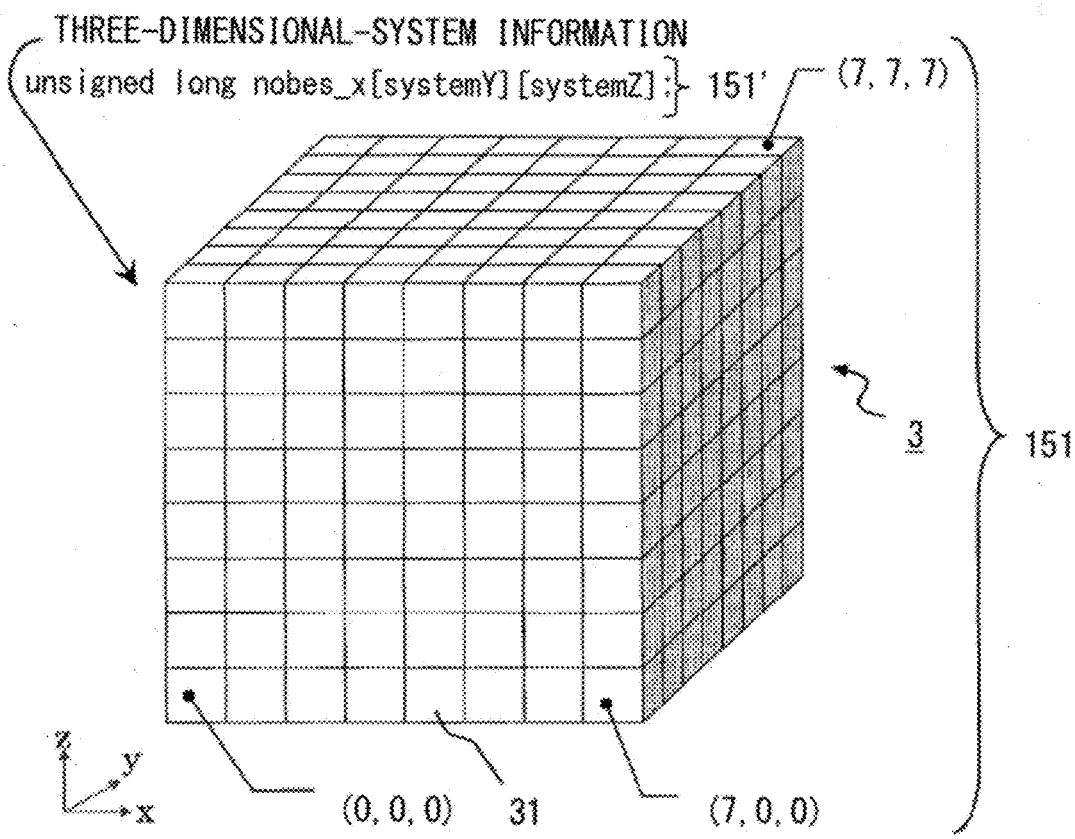
F I G. 4

| X-AXIS SEARCH INFORMATION | | SEARCH MASK PATTERN | | DETERMINATION RESULT | |
|---|---|---|---|---|---|
| STATUS | BIT VALUE | STATUS | BIT VALUE | STATUS | BIT VALUE |
| IN USE | 0 | IGNORE | 1 | ALLOCATABLE | 1 |
| IN USE | 0 | ALLOCATION REQUEST | 0 | UNALLOCATABLE | 0 |
| AVAILABLE | 1 | IGNORE | 1 | ALLOCATABLE | 1 |
| AVAILABLE | 1 | ALLOCATION REQUEST | 0 | ALLOCATABLE | 1 |

F I G. 7

FIG. 8A  X-AXIS SEARCH INFORMATION

| bit7 | bit6 | bit5 | bit4 | bit3 | bit2 | bit1 | bit0 |
|---|---|---|---|---|---|---|---|
| 0 | 0 | 0 | 1 | 1 | 1 | 0 | 0 |

131C

FIG. 8B  SEARCH MASK PATTERN

| bit7 | bit6 | bit5 | bit4 | bit3 | bit2 | bit1 | bit0 |
|---|---|---|---|---|---|---|---|
| 0 | 0 | 0 | 1 | 1 | 1 | 1 | 1 |

134B

FIG. 8C  RESULT OF OR OPERATION

| bit7 | bit6 | bit5 | bit4 | bit3 | bit2 | bit1 | bit0 |
|---|---|---|---|---|---|---|---|
| 0 | 0 | 0 | 1 | 1 | 1 | 1 | 1 |

FIG. 8D  SEARCH MASK PATTERN

| bit7 | bit6 | bit5 | bit4 | bit3 | bit2 | bit1 | bit0 |
|---|---|---|---|---|---|---|---|
| 1 | 0 | 0 | 0 | 1 | 1 | 1 | 1 |

134C

FIG. 8E  RESULT OF OR OPERATION

| bit7 | bit6 | bit5 | bit4 | bit3 | bit2 | bit1 | bit0 |
|---|---|---|---|---|---|---|---|
| 1 | 0 | 0 | 1 | 1 | 1 | 1 | 1 |

FIG. 9A

| | bit7 | bit6 | bit5 | bit4 | bit3 | bit2 | bit1 | bit0 |
|---|---|---|---|---|---|---|---|---|
| SEARCH MASK PATTERN | 1 | 1 | 0 | 0 | 0 | 1 | 1 | 1 |

| | bit7 | bit6 | bit5 | bit4 | bit3 | bit2 | bit1 | bit0 |
|---|---|---|---|---|---|---|---|---|
| RESULT OF OR OPERATION | 1 | 1 | 0 | 1 | 1 | 1 | 1 | 1 |

FIG. 9C

| | bit7 | bit6 | bit5 | bit4 | bit3 | bit2 | bit1 | bit0 |
|---|---|---|---|---|---|---|---|---|
| SEARCH MASK PATTERN | 1 | 1 | 1 | 0 | 0 | 0 | 1 | 1 |

| | bit7 | bit6 | bit5 | bit4 | bit3 | bit2 | bit1 | bit0 |
|---|---|---|---|---|---|---|---|---|
| RESULT OF OR OPERATION | 1 | 1 | 1 | 1 | 1 | 1 | 1 | 1 |

| EXAMPLE OF FIG. 16 | | EXAMPLE OF FIG. 10 | |
|---|---|---|---|
| LOOP TYPE | MAXIMUM NUMBER OF LOOPS | LOOP TYPE | MAXIMUM NUMBER OF LOOPS |
| Z LOOP OF SYSTEM | systemZ-jobZ+1 | Z LOOP OF SYSTEM | systemZ-jobZ+1 |
| Y LOOP OF SYSTEM | systemY-jobY+1 | Y LOOP OF SYSTEM | systemY-jobY+1 |
| X LOOP OF SYSTEM | systemX-jobX+1 | X LOOP OF SYSTEM | 1 |
| Z LOOP OF JOB SIZE | jobZ | Z LOOP OF JOB SIZE | jobZ |
| Y LOOP OF JOB SIZE | jobY | Y LOOP OF JOB SIZE | jobY |
| X LOOP OF JOB SIZE | jobX | X LOOP OF JOB SIZE | 1 |

F I G. 1 1

FIG. 12A X-AXIS SEARCH INFORMATION

| | bit7 | bit6 | bit5 | bit4 | bit3 | bit2 | bit1 | bit0 |
|---|---|---|---|---|---|---|---|---|
| | 0 | 0 | 0 | 1 | 1 | 1 | 0 | 0 |

131D

FIG. 12B SEARCH MASK PATTERN

| | bit7 | bit6 | bit5 | bit4 | bit3 | bit2 | bit1 | bit0 |
|---|---|---|---|---|---|---|---|---|
| | 0 | 0 | 0 | 1 | 1 | 1 | 1 | 1 |

134F

FIG. 12C RESULT OF OR OPERATION

| | bit7 | bit6 | bit5 | bit4 | bit3 | bit2 | bit1 | bit0 |
|---|---|---|---|---|---|---|---|---|
| | 0 | 0 | 0 | 1 | 1 | 1 | 1 | 1 |

NOT ALLOCATABLE FOR THREE BITS

FIG. 12D THREE-BIT RIGHTWARD SHIFT

| | bit7 | bit6 | bit5 | bit4 | bit3 | bit2 | bit1 | bit0 |
|---|---|---|---|---|---|---|---|---|
| | 1 | 1 | 1 | 0 | 0 | 0 | 1 | 1 |

134G

FIG. 12E RESULT OF OR OPERATION

| | bit7 | bit6 | bit5 | bit4 | bit3 | bit2 | bit1 | bit0 |
|---|---|---|---|---|---|---|---|---|
| | 1 | 1 | 1 | 1 | 1 | 1 | 1 | 1 |

FIG. 13A

SEARCH MASK PATTERN

| | bit7 | bit6 | bit5 | bit4 | bit3 | bit2 | bit1 | bit0 |
|---|---|---|---|---|---|---|---|---|
| | 1 | 1 | 1 | 1 | 1 | 0 | 0 | 0 |

SEARCH MASK PATTERN

| | bit7 | bit6 | bit5 | bit4 | bit3 | bit2 | bit1 | bit0 |
|---|---|---|---|---|---|---|---|---|
| | 0 | 1 | 1 | 1 | 1 | 1 | 0 | 0 |

134I

JOB MANAGEMENT APPARATUS AND JOB MANAGEMENT METHOD

CROSS-REFERENCE TO RELATED APPLICATION

This application is a continuation application of International Application PCT/JP2010/063534, filed on Aug. 10, 2010 and designated the U.S., the entire contents of which are incorporated herein by reference.

FIELD

The embodiments described herein are related to a job management apparatus and a job management method.

BACKGROUND

In a parallel computer network, which is a computer system that performs parallel processes, a plurality of computers which form a computation node group are connected via a network. Complete connections, Fat-Tree connections, mesh connections, torus connections, and so on are known as connection forms of computation nodes achieved by a network. The mesh connection and the torus connection from among these forms connect proximate nodes to each other so that more than several thousand computation nodes can be connected at a low cost. Accordingly, in parallel computer systems that include more than several thousand computation nodes, a two-dimensional torus connection and a three-dimensional mesh connection are often used.

A grid computer system has been proposed in which a super scheduler of a master node has a function of generating a grid model composed of logical nodes according to the connection topology of the plurality of nodes and inter-node connecting devices of the grid computer system, a function of analyzing a service request comprising a plurality of tasks supplied to the grid computer system, a function of determining the number of child nodes serving as base points for securing nodes needed for each service request in the grid model according to an analysis result of the service request, and a function of decentralizing and arranging the determined number of child nodes in the grid model.

As another example, a technology has been proposed wherein a disk is effectively utilized by providing within a memory a free record control area in which a take-over information file is managed, and an operating condition is expressed by one bit, i.e., expressed as "1" when each record of the file uses the control area and is expressed as "0" when each record of the file does not use the control area.

PRIOR ART DOCUMENTS

Patent Documents
Patent document 1: Japanese Laid-open Patent Publication No. 2007-206986
Patent document 2: Japanese Laid-open Patent Publication No. 6-089262

SUMMARY

According to an aspect of the embodiments, a job management apparatus searches for an available node which is a computation node in an n-dimensional in is an integer that is two or higher) mesh-connected or n-dimensional torus-connected computer network and to which a job is allocatable. The job management apparatus includes: a one-dimensional search information generating unit configured to generate one-dimensional search information, which is search information related to one dimension of n dimensions, which includes a plurality of bits, and which indicates, using one-bit information, whether or not the job is allocatable for each of a plurality of computation nodes belonging to the one dimension of the n dimensions; a search information generating unit configured to generate a search mask pattern with as many bits as corresponds to the plurality of bits, the search mask pattern including consecutive bits that correspond to a size required by the job in relation to the one dimension of the n dimensions and that are set to a preset value; and an available node searching unit configured to search for the available node by performing, for the one dimension of the n dimensions, a preset logic operation with the one-dimensional search information and the search mask pattern.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration of a job management apparatus;
FIGS. 3A-3D are an explanatory diagram of a job management process;
FIG. 4 illustrates an example of a job management process;
FIG. 7 illustrates an example of a job management process;
FIGS. 8A-8E illustrate an example of a job management process;
FIGS. 9A-9D illustrate an example of a job management process;
FIG. 11 is an explanatory diagram of a job management process;
FIGS. 12A-12E illustrate another example of a job management process;
FIGS. 13A-13B illustrate yet another example of a job management process.

DESCRIPTION OF EMBODIMENTS

In parallel computer systems, job execution times of a plurality of computers which form a computation node group are roughly classified into actual computation times of computation nodes and times of communication between the computation nodes. Thus, an increase in the time of communication between computation nodes is a cause of an increase in the job execution time.

Accordingly, in a mesh-connected or torus-connected parallel computer system, a broadband communication channel is provided between adjacent nodes, and a plurality of unit jobs are allocated to a computation node group having a consecutive rectangular or cuboid shape. A unit job is a division of one job entered by a user. A job execution time may be prevented from increasing by allocating a plurality of unit jobs to the computation node group having a consecutive rectangular or cuboid shape.

A job management apparatus performs an allocating process of allocating a plurality of unit jobs to the computation node group having a consecutive rectangular or cuboid shape. The job management apparatus searches for and allocates an available node to the unit job. The available node is a computation node to which a new unit job is allocatable. When it takes a long time to search for an available node, a time required to wait for job execution appears long to users. Moreover, when it takes a long time to search for an available node, the rate of operation of the parallel computer system is decreased.

Accordingly, the inventor analyzed a process of searching for an available node in a parallel computer system.

A job entered by a user is accepted by the job management apparatus and is divided into a plurality of unit jobs. The plurality of unit jobs are allocated to and executed by a computation node executed by the job management apparatus. To allocate a job to a computation node, the job allocation apparatus searches for an available node.

Figure 15:
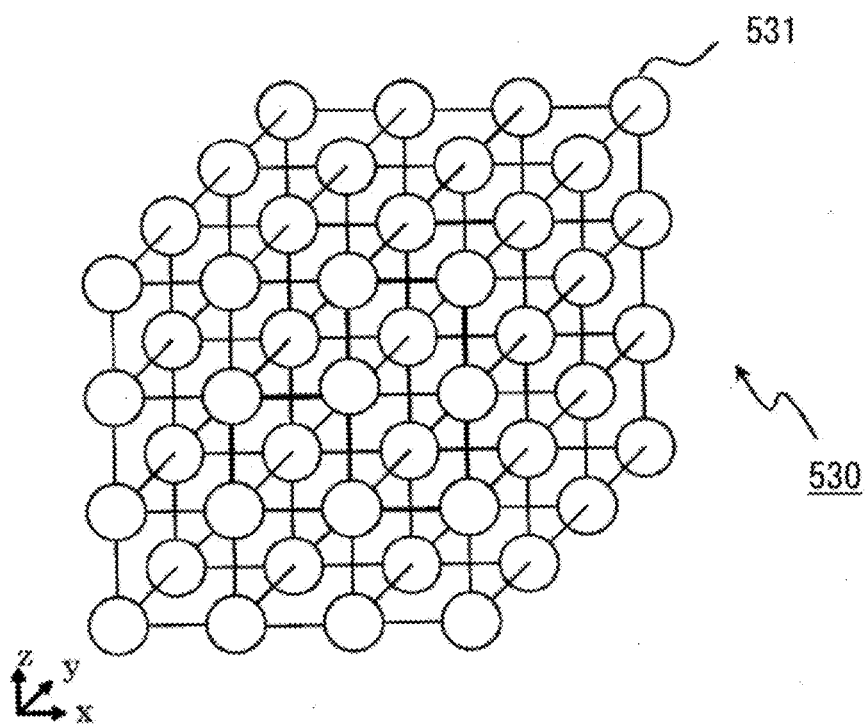
FIG. 15 is an explanatory diagram of an analyzed job management process of the present invention.
Figure 16:
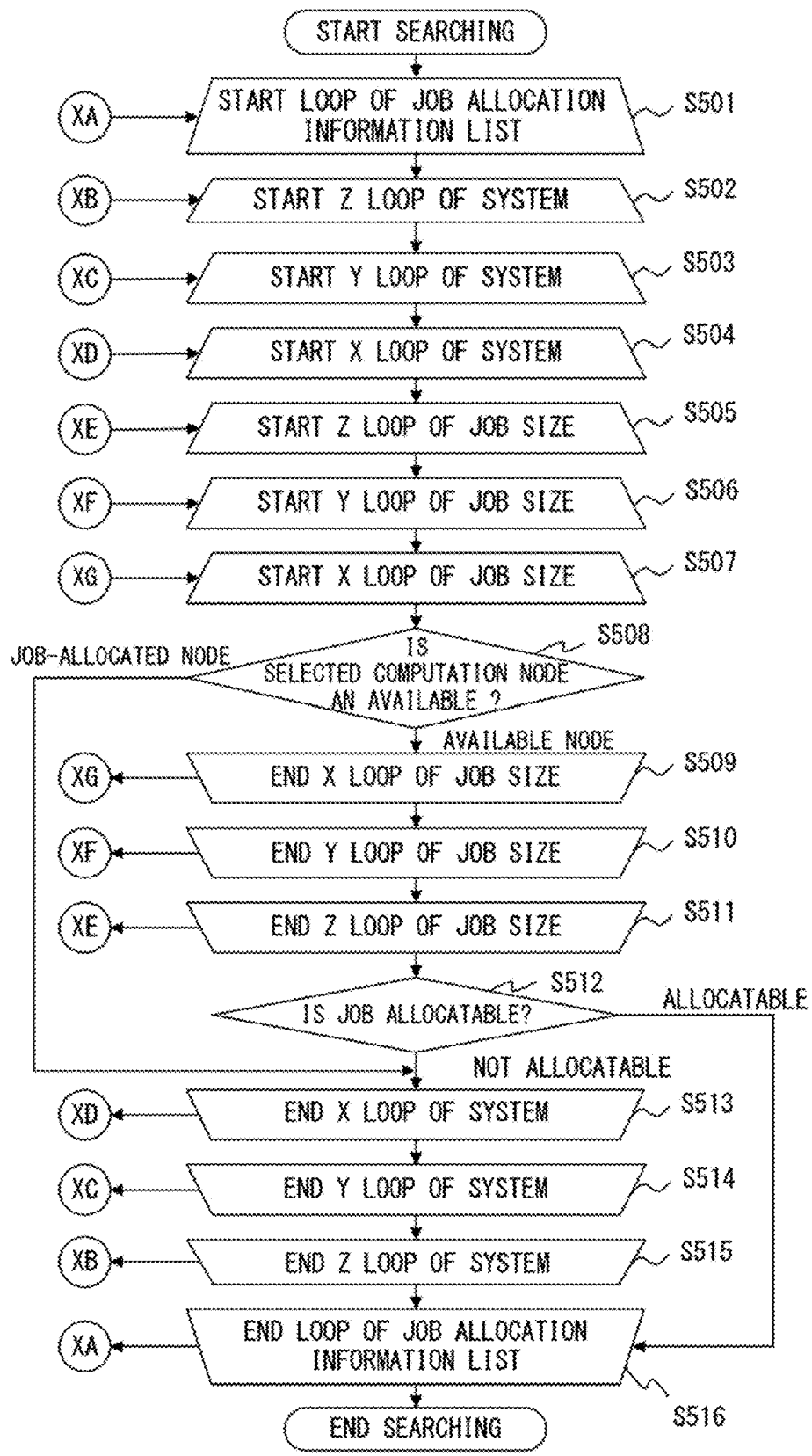
FIG. 16 illustrates a flow of an analyzed job management process of the present invention.

As an example, assume that a computation node group 530 is connected by a three-dimensional mesh network as illustrated in FIG. 15. In this case, the job management apparatus performs a process of searching for an available node 531 as illustrated in FIG. 16.

The job management apparatus starts a loop of a job allocation information list (step S501). In particular, the job management apparatus selects one job allocation information list in accordance with a preset order.

Subsequently, the job management apparatus starts a job defined by the selected job allocation information list, i.e., a sixfold loop process to allocate a computation job.

First, the job management apparatus starts a z-direction loop of the computation node group 530, i.e., a z-direction loop or the system (step S502). In particular, the job management apparatus selects a z-direction coordinate of the computation node group 530 in accordance with a preset order. The loop range of the z-direction loop of the computation node group 530 extends from "1" to "system size–job size+1".

Next, the job management apparatus starts a y-direction loop of the computation node group 530, i.e., a y-direction loop of the system (step S503). In particular, the job management apparatus selects a y-direction coordinate of the computation node group 530 in accordance with a preset order. The loop range of the y-direction loop of the computation node group 530 extends from "1" to "system size–job size+1".

Subsequently, the job management apparatus starts an x-direction loop of the computation node group 530, i.e., an x-direction loop of the system (step S503). In particular, the job management apparatus selects an x-direction coordinate of the computation node group 530 in accordance with a preset order. The loop range of the x-direction loop of the computation node group 530 extends from "1" to "system size–job size+1".

Through steps S502 to S504, a start point of job allocating in the computation node group 530, i.e., a start node 531, is selected.

Next, the job management apparatus starts a z-direction loop of a job size in the job allocation information list selected in step S501 (step S505). In particular, the job management apparatus selects a z-direction position of the job size in the job allocation information list in accordance with a preset order. The loop range of the z-direction loop of the job size extends from "1" to "job size".

The job management apparatus then starts a y-direction loop of the job size in the job allocation information list (step S506). In particular, the job management apparatus selects a y-direction position of the job size in the job allocation information list in accordance with a preset order. The loop range of the y-direction loop of the job size extends from "1" to "(job size)".

The job management apparatus then starts an x-direction loop of the job size in the job allocation information list (step S507). In particular, the job management apparatus selects an x-direction position of the job size in the job allocation information list in accordance with a preset order. The loop range of the x-direction loop of the job size extends from "1" to "(job size)".

Through steps S505 to S507, a computation node 531 that corresponds to a certain position in the job allocation information list is selected with reference to the aforementioned start point.

Next, the job management apparatus determines whether or not the selected computation node 531 is an available node (step S508). When the selected computation node 531 is not an available node, i.e., when the selected computation node 531 is a job-allocated node, the job management apparatus performs step S513 without performing steps S509 to S512.

When the selected computation node 531 is an available node, the job management apparatus ends the x-direction loop of the job size in the job allocation information list (step S509). In particular, the job management apparatus repeats step S507 when the execution of the aforementioned loop range for the x direction of the job size has not been ended, and the job management apparatus performs step S510 when the execution of the aforementioned loop range for the x direction of the job size has been ended.

Next, the job management apparatus ends the y-direction loop of the job size, in the job allocation information list (step S510). In particular, the job management apparatus repeats step S506 when the execution of the aforementioned loop range for the y direction of the job size has not been ended, and the job management apparatus performs step S511 when the execution of the aforementioned loop range for the y direction of the job size has been ended.

Subsequently, the job management apparatus ends the z-direction loop of the job size in the job allocation information list (step S511). In particular, the job management apparatus repeats step S505 when the execution of the aforementioned loop range for the z direction of the job size has not been ended, and the job management apparatus performs step S512 when the execution of the aforementioned loop range for the z direction of the job size has been ended.

The job management apparatus then determines whether or not the job is allocatable to the computation node group 530 in view of a result of the aforementioned processes (step S512). When the job is allocatable to the computation node group 530, the job management apparatus performs step S516. When the job is not allocatable to the computation node group 530, the job management apparatus performs step S513.

Next, the job management apparatus ends the x-direction loop of the computation node group 530 (step S513). In particular, the job management apparatus repeats step S504 when the execution of the aforementioned loop range for the x direction of the computation node group 530 has not been ended. The job management apparatus performs step S514 when the execution of the aforementioned loop range for the x direction of the computation node group 530 has been ended.

Subsequently, the job management apparatus ends the y-direction loop of the computation node group 530 (step S514). In particular, the job management apparatus repeats step S503 when the execution of the aforementioned loop range for the y direction of the computation node group 530 has not been ended. The job management apparatus performs step S515 when the execution of the aforementioned loop range for the y direction of the computation node group 530 has been ended.

The job management apparatus then ends the z-direction loop of the computation node group 530 (step S515). In particular, the job management apparatus repeats step S502 when the execution of the aforementioned loop range for the z direction of the computation node group 530 has not been ended. The job management apparatus performs step S516 when the execution of the aforementioned loop range for the z direction of the computation node group 530 has been ended.

Next, the job management apparatus ends the loop of the job allocation information list (step S516). In particular, the job management apparatus checks whether or not the current job allocation information list is the final list; when the current job allocation information list is not the final list, the job management apparatus repeats step S501, and, when the current job allocation information list is the final list, the job management apparatus ends the process.

In view of the descriptions above, in order to define a job start point, a triple loop consisting of the z-direction loop, the y-direction loop, and the x-direction loop of the computation node group 530 needs to be executed. Thus, a total sixfold loop needs to be executed. To allocate a job in a consecutive cuboid shape, a triple loop consisting of the z-direction loop, the y-direction loop, and the x-direction loop of the job size in a job allocation information list needs to be executed. As a result, a job is allocated to the computation node group 530 by executing a sixfold loop.

Accordingly, as the size of the computation node group 530 increases, the processing time of a sixfold loop required to search for an available node increases. This extends a time required to wait for execution of an entered job and decreases the rate of operation of the computation node group 530.

In accordance with a disclosed job management apparatus and a disclosed job management method, available nodes that are computation nodes which form a consecutive rectangular or cuboid shape and to which a plurality of unit jobs are allocated are efficiently searched for in a computer system that performs parallel processes.

First Embodiment

Figure 2A:
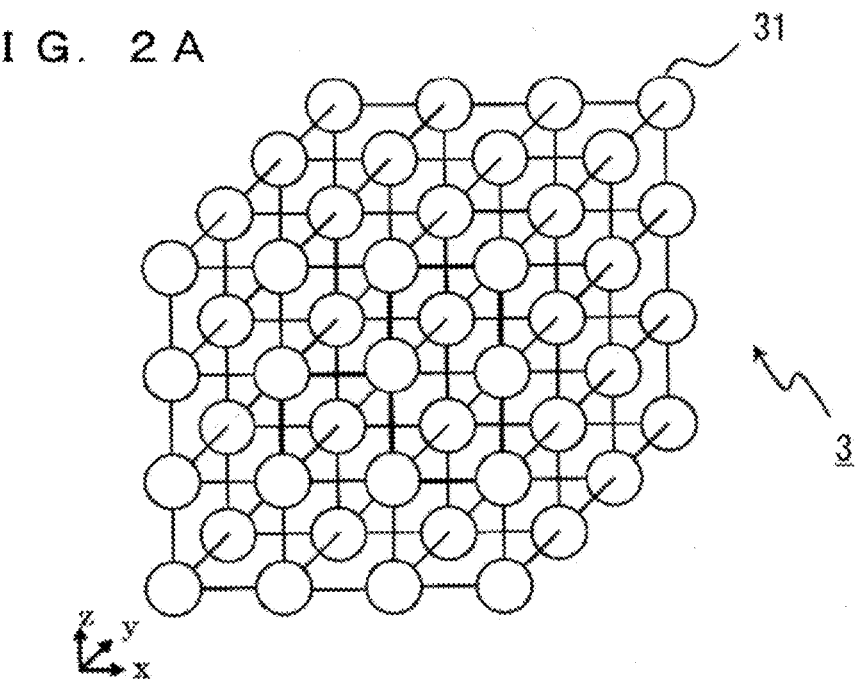
FIGS. 2A-2B illustrate a configuration of a job management apparatus.
Figure 2B:
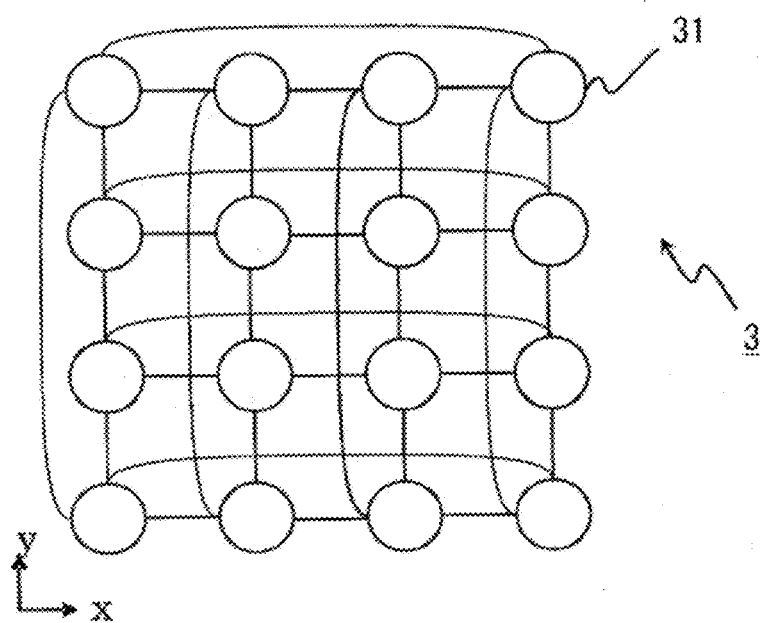

FIG. 1 and FIGS. 2A-2B illustrate a configuration of a job management apparatus. FIGS. 3A-3D are an explanatory diagram of a job management process.

As illustrated in FIG. 1, a parallel computer system includes a job management apparatus 1, a user terminal 2, and a computation node group 3. The job management apparatus 1 is connected to the user terminal 2 via a first network 4 and to the computation node group 3 via a second network 5. The first network 4 and the second network 5 may be the same network.

The computation node group 3 includes a plurality of computation nodes 31 connected as illustrated in FIG. 2A. The computation node group 3 illustrated in FIG. 2A is a three-dimensionally mesh-connected computer network, i.e., a three-dimensional mesh network. Thus, in the example in FIG. 1, the computation node group 3 is a three-dimensional mesh network. In the three-dimensional mesh network, only adjacent-computation nodes 31 are connected.

As illustrated in FIG. 2B, the computation node group 3 may be a two-dimensionally torus-connected computer network, i.e., a two-dimensional torus network. Also in the two-dimensional torus network, only adjacent computation nodes 31 are connected. The computation nodes 31 at both ends may be considered to be adjacent. The computation node group 3 may be an n-dimensional computer network. Note that n is an integer that is two or greater.

The job management apparatus 1 searches for an available node 31 and allocates a job to a computation node 31 according to a result of the searching. A computation node 31 within the computation node group 3 to which a job is allocatable will hereinafter be referred to as an available node 31. Accordingly, the job management apparatus 1 includes a job accepting process unit 11, a job execution controlling unit 12, a storage unit 13, a job allocating process unit 14, and a computation node information storage unit 15. The job accepting process unit 11 includes an allocation information generating unit 111. The storage unit 13 includes an x-axis search information storage unit 131, a job allocation information storage unit 132, and a search information storage unit 133. The job allocating process unit 14 includes an available node searching unit 141 and a computation node management unit 142. The computation node information storage unit 15 includes a three-dimensional-system information storage unit 151.

The storage unit 13 is a memory used by the job accepting process unit 11, the job execution controlling unit 12, and the job allocating process unit 14. The computation node information storage unit 15 is a memory used by the computation node management unit 142. The job accepting process unit 11, the job execution controlling unit 12, and the job allocating process unit 14 are implemented by a process program.

The computation node management unit 142 generates three-dimensional-system information 151' for the computation node group 3. As an example, the computation node management unit 142 generates the three-dimensional-system information 151' illustrated in FIG. 3A according to structure information and availability information. The structure information and the availability information are input to the computation node management unit 142 and held in the information storage unit 15. The generated three-dimensional-system information 151' is stored in the three-dimensional-system information storage unit 151 of the computation node information storage unit 15. Three-dimensional-system information 151' will be described hereinafter.

Structure information indicates the position of each computation node 31 of the computation node group 3. Availability information indicates whether each computation node 31 is "available" or is "in use". A position in the computation node group 3 is expressed by an x coordinate which indicates an x-direction position of the computation node group 3, a y coordinate which indicates a y-direction position, and a z coordinate which indicates a z-direction position. In three-dimensional-system information, an available node is indicated as logic "1" and an in-use node is indicated as logic "0".

The job accepting process unit 11 receives and executes a job entering command transmitted from the user terminal 2. In other words, the job accepting process unit 11 accepts and transmits the received job entering command to the job allocating process unit 14.

Meanwhile, the allocation information generating unit 111 of the job accepting process unit 11 generates the job allocation information 132' illustrated in FIG. 3C according to the job entering command and transmits this job allocation information 132' to the job allocating process unit 14. The job allocation information 132' at this moment only stores an initial value, as will be described hereinafter. The job allocating process unit 14 stores the received job allocation information 132' in the job allocation information storage unit 132 of the storage unit 13. The job allocation information 132' will be described hereinafter.

The available node searching unit 141 of the job allocating process unit 14 allocates a job to the computation node group 3. In particular, according to the three-dimensional-system information 151', the available node searching unit 141 generates x-axis search information 131', illustrated in FIG. 3B. The generated x-axis search information 131' is stored in the x-axis search information storage unit 131 of the storage unit 13. The x-axis search information 131' will be described hereinafter.

According to job allocation information 132', the available node searching unit 141 generates search information 133', illustrated in FIG. 3D. The generated search information 133' is stored in the search information storage unit 133 of the storage unit 13. The job allocation information 132' will be described hereinafter.

The search information 133' includes a search mask pattern, as will be described hereinafter. The search mask pattern is used to search for an available node 31.

Using the x-axis search information 131' and the search information 133', the available node searching unit 141 searches for an available node 31 in the computation node group 3. In this case, the available node searching unit 141 actually searches for an available node 31 mainly by performing a logic operation with the x-axis search information 131' and the search mask pattern. The available node searching unit 141 allocates a job to an available node 31 according to a result of the searching for the available node 31. In other words, the available node searching unit 141 completes and transmits the job allocation information 132' to the job execution controlling unit 12.

The job execution controlling unit 12 controls execution of the job according to the received job allocation information 132'. In other words, the job execution controlling unit 12 causes the computation node 31 to which the job has been allocated to execute the job.

In the following, a job allocating process in a parallel computer system will be specifically described with reference to FIG. 4 to FIGS. 9A-9D.

FIG. 4 illustrates an example of three-dimensional-system information.

As illustrated in FIG. 4, the computation node management unit 142 generates three-dimensional-system information 151' for each computation node 31 of the computation node group 3. The three-dimensional-system information 151' is actually a three-dimensional array representation of the structure of the computation node group 3.

In the three-dimensional-system information 151' in FIG. 3A, [systemX] is a value within the range of the x direction of the computation node group 3, [systemY] is a value within the range of the y direction of the computation node group 3, and [systemZ] is a value within the range of the z direction of the computation node group 3. Accordingly, according to structure information, the computation node management unit 142 defines as [systemX] a minimum value to a maximum value of the x coordinates of the plurality of computation nodes 31, defines as [systemY] a minimum value to a maximum value of the y coordinates of the plurality of computation nodes 31, and defines as [systemZ] a minimum value to a maximum value of the z coordinates of the plurality of computation nodes 31. As a result, as illustrated in FIG. 4, the computation node group 3 may be represented as a cuboid shape.

As an example, in FIG. 4, the x coordinates go from 0 to 7, the y coordinates go from 0 to 7, and the z coordinates go from 0 to 7. Thus, the maximum value of [systemX] is 8, the maximum value of [systemY] is 8, and the maximum value of [systemZ] is 8. In this case, the configuration of the computation node group 3 is 8×8×8. The ranges of [systemX], [systemY], and [systemZ] may be different from each other.

Meanwhile, three-dimensional-system information 151' includes available node information for each computation node 31 included in the computation node group 3. The available node information indicates logic "1" to indicate that the computation node 31 is an available node or indicates logic "0" to indicate that the computation node 31 is an in-use node.

Figure 5:
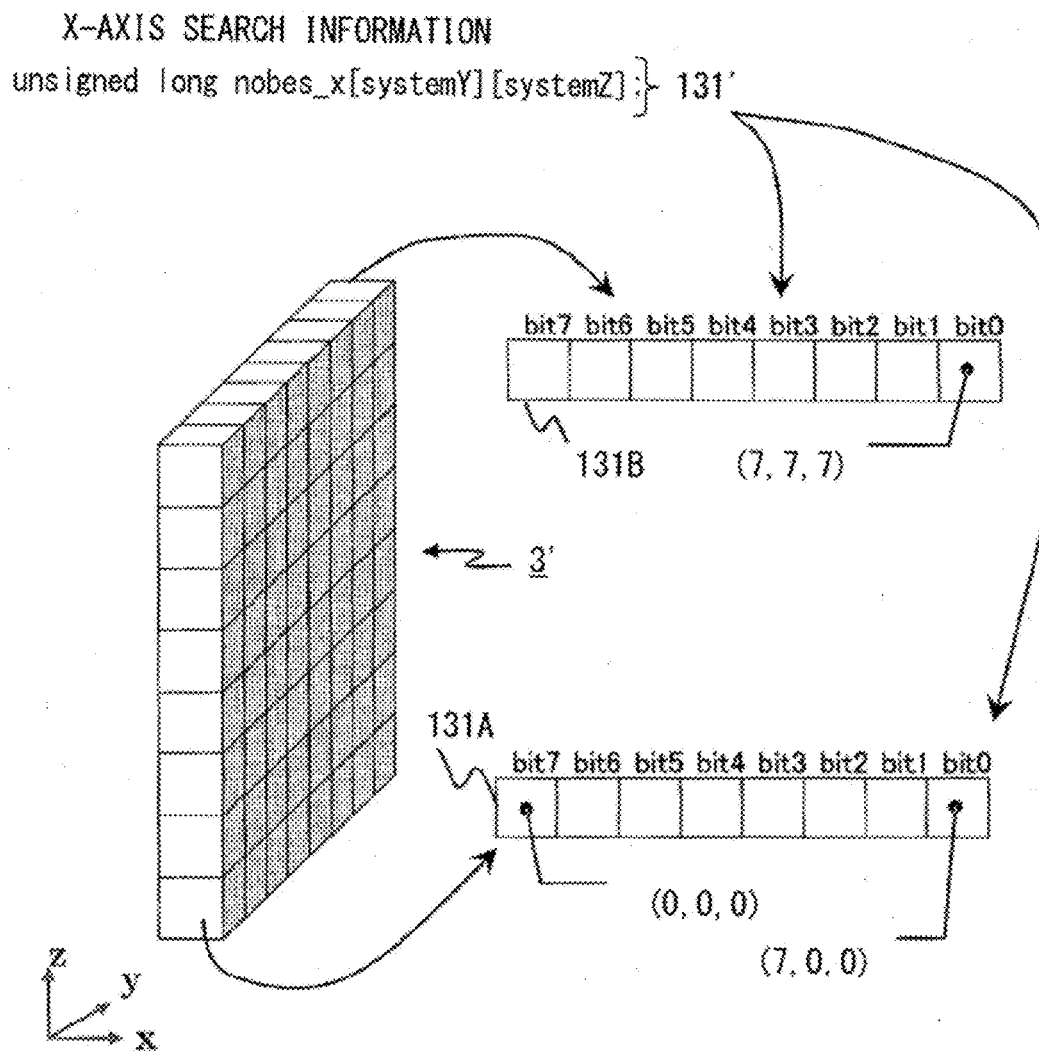
FIG. 5 illustrates an example of a job management process.

FIG. 5 illustrates an example of x-axis search information.

As illustrated in FIG. 5, the available node searching unit 141 generates x-axis search information 131' according to three-dimensional-system information 151'. The x-axis search information 131' is the search information related to one of three dimensions. In other words, x-axis search information 131' is one-dimensional search information. The one-dimensional search information includes a plurality of bits. Using one-bit information, the x-axis search information 131' indicates whether or not a job is allocatable for each of the plurality of computation nodes belonging to the x axis, which is one of the three dimensions. In other words, the x-axis search information 131' represents, with one bit, each of a plurality of elements of an array x of the three-dimensional-system information 151' and stores the plurality of elements of the array x with one variable.

Instead of x-axis search information 131', y-axis search information or z-axis search information may be generated.

In the x-axis search information 131' in FIG. 3B, x is all of the values in the x direction of the computation node group 3. Meanwhile, [systemY] is a value within the range of the y direction of the computation node group 3, and [systemZ] is a value within the range of the z direction of the computation node group 3. Accordingly, the x-axis search information 131' includes a plurality of pieces of x-axis search information, namely, x-axis search information 131A, 131B, and so on. In other words, the x-axis search information 131' is generated for each of the computation nodes 31 which have common coordinates (y, z) but each of which has a different x coordinate. The number of pieces of the x-axis search information 131' is [systemY]×[systemZ].

As an example, x-axis search information 131A is information related to the computation nodes 31 that have common coordinates (y, z)=(0,0). As illustrated in FIG. 5, the x-axis search information 131A includes the available node information related to a plurality of computation nodes 31 extending from the coordinates (x, y, z)=(0,0,0) to the coordinates (x,y,z)=(7,0,0). When, for example, the computation node 31 with the coordinates (0,0,0) is an available node, bit7 of the x-axis search information 131A is "1". Bit6 to bit0 are also determined in accordance with available node information. The number of bits of the x-axis search information 131A is identical with [systemX], i.e., with the range of the x direction of the computation node group 3; in the case of FIG. 5, the number of bits is 8.

Using the x-axis search information 131', the computation node group 3 is indicated as a computation node group 3' illustrated in FIG. 5. The computation node group 3' is obtained by replacing the three-dimensional computation node group 3 with a two-dimensional array arranged in the y direction and the z direction, wherein, each element of the two-dimensional array is an eight-bit data row.

Figure 6:
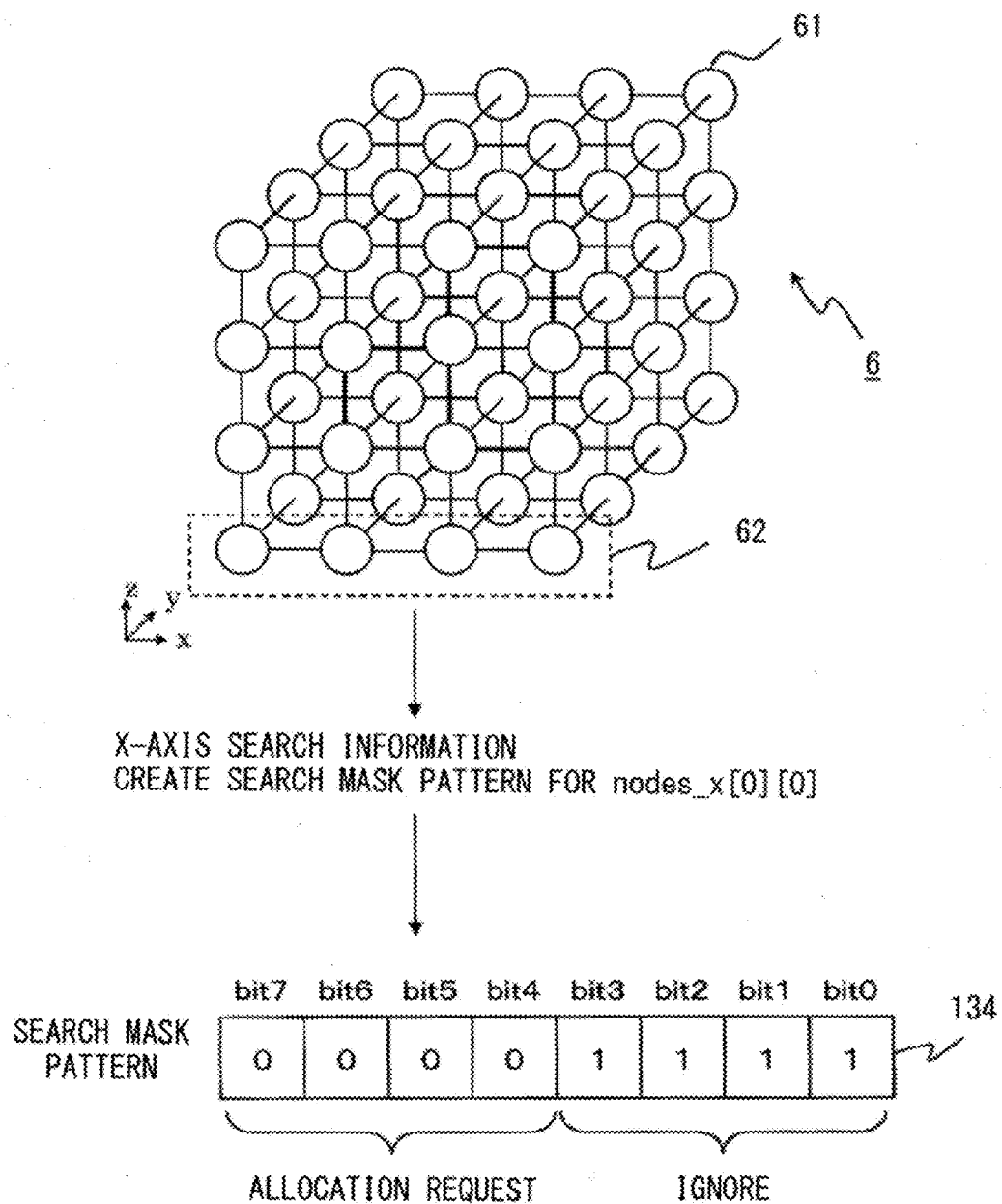
FIG. 6 illustrates an example of a job management process.

FIG. 6 illustrates an example of a search mask pattern.

As illustrated in FIG. 6, the available node searching unit 141 generates a search mask pattern 134. The search mask pattern 134 includes as many bits as corresponds to a plurality of bits of x-axis search information 131A. In other words, the number of bits of the search mask pattern 134 is the same as the number of bits of the x-axis search, information 131A. The search mask pattern 134 is obtained by setting, to a preset value, consecutive bits corresponding to a size which a job requests for one of the three dimensions. In other words, the search mask pattern 134 is generated for the same coordinate axis as the x-axis search information 131A. Thus, the search mask pattern 134 in FIG. 6 is used to perform an x-axis search.

When y-axis search information or z-axis search information is generated instead of x-axis search information 131', a mask pattern directed to a y-axis search or a mask pattern directed to a z-axis search is generated instead of the search mask pattern 134.

As described above, the search mask pattern 134 is included in search information 133', and the search information 133' is generated according to job allocation information 132'. Accordingly, firstly, the job allocation information 132' in FIG. 3C will be described.

In the job allocation information 132' in FIG. 3C, a job start coordinate (x) is the minimum value of [systemX] in FIG. 3A, a job start coordinate (y) is the minimum value of [systemY] in FIG. 3A, and a job start coordinate (z) is the minimum value of [systemZ] in FIG. 3A. The minimum value of [systemX], the minimum value of [systemY], and the minimum value of [systems] are "0", in other words, job allocation is determined sequentially starting from the computation node 31 that has the coordinates (0,0,0).

In the job allocation information 132' in FIG. 3C, a job shape (x) is an x-direction size of a job, a job shape (y) is a y-direction size of the job, and a job shape (z) is a z-direction size of the job. The job shape (x), the job shape (y), and the job shape (z) are designated by a job entering command input from the user terminal 2.

An entire request shape 6 of the job is determined according to the job shape (x), the job shape (y), and the job shape (z). As an example, when the job shape (x) is "4", the job shape (y) is "4", and the job shape (z) is "4", the entire request shape 6 of the job is determined as illustrated in FIG. 6. In this case, assuming that the entire request shape 6 of the job is indicated as "job shape (x)×job shape (y)×job shape (z)", the entire request shape 6 of the job is "4×4×4". In other words, the entire request shape 6 of the job includes job request elements 61 of "4×4×4". Each job request element 61 corresponds to and is allocated to each computation node 31.

In the job allocation information 132' in FIG. 3C, an allocatable flag is "1" when the job is allocatable to the computation node group 3 and is "0" when the job is not allocatable. At this moment, the allocatable flag is "0" since it is unclear whether or not the job is allocatable.

Assume that the number of the computation nodes 31 requested by a job, i.e., the number of unit jobs into which the job is divided, is, for example, "64". In this case, there may be a plurality of combinations of the entire shapes 6 of the job that satisfy "64". In particular, the entire request shape 6 of the job may be any of "4×4×4", "2×8×4", and "2×2×16".

Accordingly, the allocation information generating unit 111 actually generates a plurality of job allocation information lists as job allocation information 132'. The number of the generated job allocation information lists is the number of combinations of the entire shapes 6 of the job.

Only job shapes (x), job shapes (y), and job shapes (z) are different between the plurality of job allocation information lists. As an example, in a first job allocation information list, the job shape (x) is "4", the job shape (y) is "4", and the job shape (z) is "4"; in a second job allocation information list, the job shape (x) is "2", the job shape (y) is "8", and the job shape (z) is "4"; in a third job allocation information list, the job shape (x) is "2", the job shape (y) is "2", and the job shape (z) is "16". For each of the plurality of job allocation information lists, search information 133' is generated, and a search is performed to determine whether or not a job is allocatable.

Next, in the search information 133' in FIG. 3D, a job start coordinate (x) is obtained from a job start coordinate (x) of the job allocation information 132', a job start coordinate (y) is obtained from a job start coordinate (y) of the job allocation information 132', and a job start coordinate (z) is obtained from a job start coordinate (z) of the job allocation information 132'. The job start coordinate (y) is used as an initial value of a y-direction loop of the parallel computer system, and the job start coordinate (z) is used as an initial value of a z-direction loop of the parallel computer system.

In the search information 133' in FIG. 3D, a job shape (x) is obtained from a job shape (x) of the job allocation information 132', a job shape (y) is obtained from a job shape (y) of the job allocation information 132', and a job shape (z) is obtained from a job shape (z) of the job allocation information 132'. The job shape (x), the job shape (y), and the job shape (z) are fixed.

In the search information 133' in FIG. 3D, a search mask pattern is obtained as the search mask pattern 134 in FIG. 6. As described above, the number of bits of the search mask pattern 134 is the same as the number of bits of the x-axis search information 131A. Thus, the number of bits of the search mask pattern 134 that is used to search the computation node group 3 in FIG. 4 and FIG. 5 is "8".

Meanwhile, assume that the entire request shape 6 of the job includes, for example, a job shape (x) that is "4", a job shape (y) that is "4", and a job shape (z) that is "4", as illustrated in FIG. 6. Accordingly, as described above, the search mask pattern 134 is obtained for the x axis by setting from bit7 to bit4, which are consecutive bits corresponding to the size "4" requested by the job, to a preset value "0". In this case, in the search mask pattern 134, the four consecutive bits that start from the leading bit7 are set to "0". As a result, consecutive available nodes 31 may be detected in the x-axis direction. Also in this case, sizes other than the size for which the job requests allocation, i.e., bit3 to bit0 corresponding to computation nodes 31 not included in the range of job allocation, are set to "1". The computation nodes 31 not included in the range of job allocation are within a range ignored in a job allocating process. Size "4", requested for the x axis by the job, corresponds to a partial shape 62 of the entire request shape 6 of the job.

FIG. 7 illustrates an example of an available node search.

The available node searching unit 141 searches for an available node 31 by performing, for the x axis, a preset logic operation with x-axis search information 131' and the search mask pattern 134. Thus, as described above, in the x-axis search information 131', "0" indicates an in-use node and "1" indicates an available node. In the search mask pattern 134, "0" indicates a computation node for which allocation is requested, and "1" indicates a node not included in an allocation range.

Accordingly, when an allocation request is ignorable for an in-use computation node 31 as illustrated in FIG. 7, i.e., when the bit value of the search mask pattern 134 is "1" for the computation node 31 with the bit value "0", any determination may be made, so it will be determined that a job is allocatable.

Assume that "1" indicates that a job is allocatable and "0" indicates that a job is not allocatable. In this case, using an operation result "1" determined by a logical sum (an OR operation) of "0" indicative of in-use and "1" indicative of ignorance, it may be determined that a job is allocatable.

The operation to determine whether a job is allocatable is not limited to a logical sum. Accordingly, various logic operations may be used in accordance with a setting of the determination logic illustrated in FIG. 7.

When an allocation request is made for an in-use computation node 31, i.e., when the bit value of the search mask pattern 134 is "0" for the computation node 31 with a bit value "0", it is determined that a job is not allocatable. This indicates that it is impossible to perform typical allocating. In this case, using an operation result "0" determined by the logical sum of "0" indicative of in-use and "0" indicative of an allocation request, it may be determined that a job is not allocatable.

When an allocation request is ignorable for an available computation node 31 as illustrated in FIG. 7, i.e., when the bit value of the search mask pattern 134 is "1" for the computation node 31 with bit value "1", any determination may be made, so it will be determined that a job is allocatable. In this case, using an operation result "1" determined by a logical sum (an OR operation) of "1" indicative of an available node and "1" indicative of ignorance, it may be determined that a job is allocatable.

When an allocation request is made for an available computation node 31, i.e., when the bit value of the search mask pattern 134 is "0" for the computation node 31 with bit value "1", it is determined that a job is allocatable. This indicates that it is possible to perform original allocating. In this case, using an operation result "1" determined by a logical sum of "1" indicative of an available node and "0" indicative of an allocation request, it may be determined that a job is allocatable.

FIGS. 8A-8E and FIGS. 9A-9D illustrate an example of a determination for job allocation. For convenience in describing a shift process on the search mask pattern 134, the example illustrated in FIGS. 8A-8E and FIGS. 9A-9D is different from the example illustrated in FIG. 4 to FIG. 6.

In a situation in which the aforementioned operation result of the logical sum is "0", the available node searching unit 141 performs a shift process on the search mask pattern 134. The situation in which the operation result of the logical sum is "0" is a situation in which the logical sum of x-axis search information 131' and the search mask pattern 134 indicates for the x axis that a job is not allocatable. The shift process on the search mask pattern 134 is shifting, for example, bit7 to bit4, which are consecutive bits corresponding to size "4" requested by a job, in a preset direction by one bit. The preset direction is a direction in which a coordinate value in the x-axis direction increases, i.e., a direction toward bit0.

As an example, in x-axis search information 131C, assume that bit7 to bit5 are "0", bit4 to bit0 are "1", and bit1 to bit0 are "0" as illustrated in FIG. 8A. This indicates that the computation nodes 31 that correspond to bit7 to bit5 are in use, the computation nodes 31 that correspond to bit4 to forcer are available, and the computation nodes 31 that correspond to bit1 to bit0 are in use.

As another example, in a search mask pattern 134B, assume that bit7 to bit5 are "0" and bit4 to bit2 are "1" as illustrated in FIG. 8B. This indicates that the computation nodes 31 that correspond to bit7 to bit5 are objects of an allocation request, and the computation nodes 31 that correspond to bit4 to bit0 are unrelated to the allocation and are thus ignorable.

The available node searching unit 141 determines a logical sum of the x-axis search information 131C in FIG. 8A and the search mask pattern 134B in FIG. 8B. The operation result of the logical sum indicates that bit7 to bit5 are "0" and bit4 to bit0 are "1" as illustrated in FIG. 8C. Thus, bit7 to bit5 need to indicate "unallocatable", and bit4 to bit0 need to indicate "allocatable".

As described above, the computation nodes 31 that correspond to bit7 to bit5 are objects of the allocation request, and the computation nodes 31 that correspond to bit4 to bit0 are unrelated to the allocation. As a result, a job is not allocatable to the computation nodes 31 that correspond to bit7 to bit5 and that are objects of the allocation request.

Accordingly, for the search mask pattern 134B in FIG. 8B, the available node searching unit 141 shifts the consecutive bits bit7 to bit5 corresponding to size "3" requested by the job in the direction of bit0 by one bit. As a result, a search mask pattern 134C in FIG. 8D is obtained.

After the shift process on the search mask pattern 134B is performed, the available node searching unit 141 again searches for an available node by determining a logical sum with x-axis search information 131' and the shifted search mask pattern 134C.

The operation result of the logical sum of the x-axis search information 131C in FIG. 8A and the shifted search mask pattern 134C in FIG. 8D indicates that bit7 is "1", bit6 to bit5 are "0", and bit4 to bit0 are "1", as illustrated in FIG. 8E. Thus, bit7 needs to indicate "allocatable", bit6 to bit5 need to indicate "unallocatable", and bit4 to bit0 need to indicate "allocatable".

As described above, the computation nodes 31 that correspond to bit7 to bit5 are objects of the allocation request, and the computation nodes 31 that correspond to bit4 to bit0 are unrelated to the allocation. As a result, a job is not allocatable to the computation nodes 31 that correspond to bit7 to bit5 and that are objects of the allocation request.

Accordingly, for the search mask pattern 134C in FIG. 8D, the available node searching unit 141 shifts the consecutive bits bit6 to bit4 corresponding to size "3" requested by the job in the direction of bit0 by one bit. As a result, a search mask pattern 134D in FIG. 9A is obtained.

After the shift process on the search mask pattern 134C is performed, the available node searching unit 141 again searches for an available node by determining a logical sum with x-axis search information 131' and the shifted search mask pattern 134D.

The operation result of the logical sum of the x-axis search information 131C in FIG. 8A and the search mask pattern 134D in FIG. 9A indicates that bit7 to bit6 are "1", bit5 is "0", and bit4 to bit0 are "1" as illustrated in FIG. 9B. Thus, bit7 to bit6 need to indicate "allocatable", bit5 needs to indicate "unallocatable", and bit4 to bit0 need to indicate "allocatable".

As described above, the computation nodes 31 that correspond to bit7 to bit5 are objects of the allocation request, and the computation nodes 31 that correspond to bit4 to bit0 are unrelated to the allocation. As a result, a job is not allocatable to the computation nodes 31 that correspond to bit7 to bit5 and that are objects of the allocation request.

Accordingly, for the search mask pattern 134D in FIG. 9A, the available node searching unit 141 shifts the consecutive bits bit5 to bit3 corresponding to size "3" requested by the job in the direction of bit0 by one bit. As a result, a search mask pattern 134E in FIG. 9C is obtained.

After the shift process on the search mask pattern 134D is performed, the available node searching unit 141 again searches for an available node by determining a logical sum with x-axis search information 131' and the shifted search mask pattern 134E.

The operation result of the logical sum of the x-axis search information 131C in FIG. 8A and the search mask pattern 134E in FIG. 9C indicates that bit7 to bit0 are "1" as illustrated in FIG. 9D. Thus, bit7 to bit0 need to indicate "allocatable".

As described above, the computation nodes 31 that correspond to bit7 to bit5 are objects of the allocation request, and the computation nodes 31 that correspond to bit4 to bit0 are unrelated to the allocation. As a result, a job is allocatable to the computation nodes 31 that correspond to bit7 to bit5 and that are objects of the allocation request.

The search information related to the x axis has been described above. For the axes other than the x axis, i.e., the y axis and the z axis, the available node searching unit 141 searches for available nodes 31 by repeating a determining process of determining whether or not a node is an available node 31 in a preset order starting from a start point.

Accordingly, a process of determining a start point of a job may be performed for only the z-direction loop and the y-direction loop of the parallel computer system, thereby omitting the x-direction loop. A process of allocating a job in a consecutive rectangular shape may be performed for only the z-direction loop and the y-direction loop of the job size, thereby omitting the x-direction loop. Thus, the job is allocated to the parallel computer system by executing a fourfold loop, not a sixfold loop. Accordingly, the time required to wait for execution of an entered job may be shortened, and the rate of operation of the parallel computer system may be enhanced.

Figure 10:
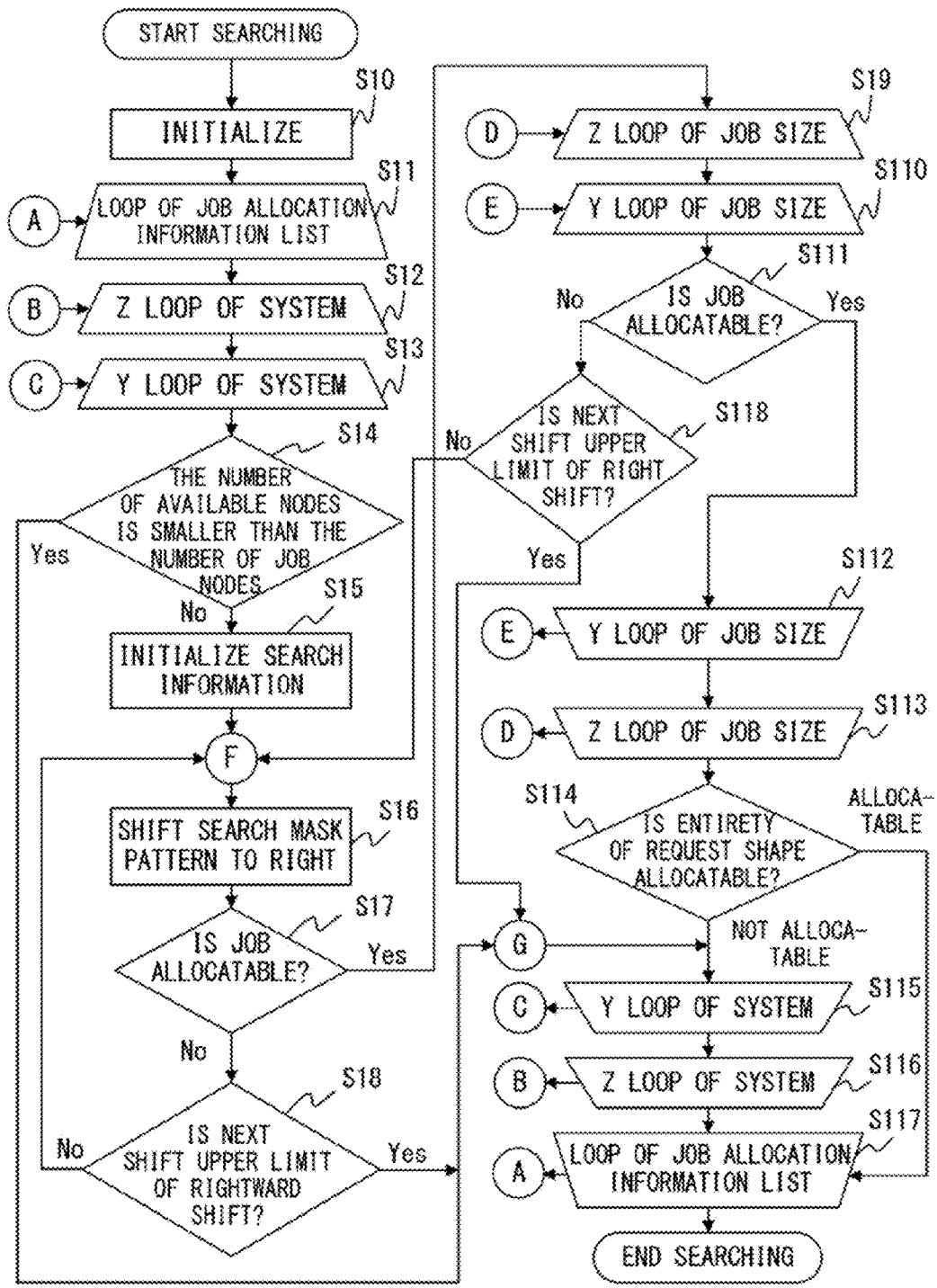
FIG. 10 illustrates a flow of a job management process.

FIG. 10 illustrates a flow of a job management process.

The available node searching unit 141 performs an initializing process to generate x-axis search information 131' according to three-dimensional-system information 151' (step S10).

Next, the available node searching unit 141 starts a loop of a job allocation information list (step S11). The loop of the job allocation information list is a process of performing loop control as many times as the number of a plurality of job allocation lists included in job allocation information 132'. In particular, the available node searching unit 141 selects one job allocation information list from the job allocation 132' in accordance with a preset order. At this moment, in the job allocation information list, which is the job allocation information 132', "unallocatable (false)" is set for an allocatable flag.

Subsequently, the available node searching unit 141 starts a fourfold loop process to allocate a job defined in the selected job allocation information list, i.e., a computation job.

The available node searching unit 141 first starts a z-direction loop of the computation node group 3, i.e., the parallel computer system (step S12). In particular, the available node searching unit 141 selects z-direction coordinates of the computation node group 3 in accordance with a preset order. The z-direction loop of the computation node group 3 will hereinafter be referred to as a "z loop of the system". The z loop of the system controls a start point of a search in the z direction. A loop range of the z loop of the system extends from "1" to "system size–job size 1".

The available node searching unit 141 then starts a y-direction loop of the computation node group 3, i.e., the parallel computer system (step S13). In particular, the available node searching unit 141 selects y-direction coordinates of the computation node group 3 in accordance with a preset order. Accordingly, one piece of x-axis search information 131' is selected. The y-direction loop of the computation node group 3 will hereinafter be referred to as a "y loop of the system". The y loop of the system controls a start point of a search in the y direction. A loop range of the y loop of the system extends from "1" to "system size–job size+1".

Through steps S12 to S13, a start point of job allocating in the computation node group 3, i.e., the x-axis search information 131' related to the start point, is selected.

Next, for the selected x-axis search information 131', the available node searching unit 141 determines whether or not the number of available nodes 31 is smaller than the number of computation nodes 31 requested by the job (step S145). In particular, the available node searching unit 141 counts the number of "1"s in the x-axis search information 131' and compares the counted value with an x-direction job size. When the number of available nodes 31 is less than the job size, a searching process of searching for available nodes 31 may be prevented from being performed in vain to shorten the processing time.

When the number of available nodes 31 is smaller than the number of computation nodes 31 requested by the job (Yes in step S14), the available node searching unit 141 performs step S115.

When the number of available nodes 31 is not smaller than the number of computation nodes 31 requested by the job (No in step S14), the available node searching unit 141 initializes search information 133' (step S15).

In particular, the available node searching unit 141 sets "0" for a job start coordinate (x), a job start coordinate (y), and a job start coordinate (z) in the search information 133'. For the search information 133', the available node searching unit 141 also sets, as a job shape (x), the job shape (x) from the job allocation information 132', sets, as a job shape (y), the job shape (y) from the job allocation information 132', and sets, as a job shape (z), the job shape (z) from the job allocation information 132'. In addition, the available node searching unit 141 generates a search mask pattern 134 in the search information 133'. In the search mask pattern 134, as many "0"s as the number of job shapes (x) are set for bits starting from the leftmost bit bit7, and "1"s are set for the remaining bits. As a result, the search mask pattern 134 illustrated in, for example, FIG. 6 is obtained. In addition, the available node searching unit 141 sets "0" for the total number of shifts and "0" for the number of shifts in the search information 133'.

Next, for the search mask pattern 134, the available node searching unit 141 shifts as many "0"s as the number of job shapes (x) in the direction of bit 0 as many times as the number of shifts in the search information 133', i.e., rightward shifts are performed (step S16). The shift process is not performed when the number of shifts is "0". Accordingly, when the number of shifts is an initial value, the shift process is not performed. The available node searching unit 141 adds the number of shifts to the total number of shifts in the search information 133'.

In the case of the computation node group 3 that is the torus-connected computer network illustrated in FIG. 2B, when the sum of the x-direction job size and the total number of shifts becomes equal to or greater than the size of the x-axis search information 131' or the search mask pattern 134, processes will be performed as will be described hereinafter with reference to FIGS. 13A-13B.

Next, the available node searching unit 141 determines whether or not a job is allocatable by performing an OR operation with the x-axis search information 131' and the search mask pattern 134 (step S17).

When a job is not allocatable (No in step S17), the available node searching unit 141 adds +1 to the number of shifts and then determines whether or not a next shift for as many "0"s as the number of job shapes (x) is an upper limit of the rightward shift (step S16). When the next shift is the upper limit of the rightward shift (Yes in step S18), the available node searching unit 141 performs step S115. When the next shift is not the upper limit of the rightward shift (No in step S18), the available node searching unit 141 performs step S16.

In the case of the computation node group 3 with the mesh connection in FIG. 2A, the upper limit of the rightward shift indicates a situation in which the sum of the total number of shifts and the x-direction job size, becomes equal to or greater than the size of the x-axis search information 131' or the search mask pattern 134. In other words, when the sum of the total number of shifts and the x-direction job size is less than the size of the x-axis search information 131' or the search mask pattern 134, a rightward shift is not at the upper limit.

As an example, in the search mask pattern 134 in FIG. 6, the x-direction job size is "4", and the size of the search mask pattern 134 is "8". Thus, when the total number of shifts is equal to or smaller than "3", a rightward shift is not at the upper limit; when the total number of shifts is equal to or larger than "4", a rightward shift is at the upper limit.

In the case of the computation node group 3 with the torus connection in FIG. 2B, when the total number of shifts is less than the size of the x-axis search information 131' or the search mask pattern 134, step S16 is performed since a rightward shift is not at the upper limit. When the total number of shifts is equal to or greater than the size of the x-axis search information 131' or the search mask pattern 134, step S115 is performed since a rightward shift is at the upper limit.

When a job is allocatable in step S17 (Yes in step S17), the available node searching unit 141 starts a z-direction loop of a job site in the job allocation information list selected in step S11 (step S19). In particular, the available node searching unit 141 selects z-direction positions of a job size in the job allocation information list in accordance with a preset order. The z-direction loop in the job allocation list will hereinafter be referred to as a "z loop of the job size". The z loop of the job size controls, in the z direction, searching for an available node performed in accordance with the search mask pattern 134. A loop range of the z loop of the job size extends from "1" to "job size".

Next, the available node searching unit 141 starts a y-direction loop of a job size in the job allocation information list (step S110). In particular, the available node searching unit 141 selects y-direction positions of a job size in the job allocation information list in accordance with a preset order. The y-direction loop in the job allocation list will hereinafter be referred to as a "y loop of the job size". The y loop of the job size controls, in the y direction, searching for an available node performed in accordance with the search mask pattern 134. A loop range of the y loop of the job size extends from "1" to "job size". Through steps S19 to S110, the x-axis search information 131' that corresponds to a certain position in the job allocation list is selected with reference to the aforementioned start point.

Next, the available node searching unit 141 determines whether or not a job is allocatable by performing an OR operation with the x-axis search information 131' and the search mask pattern 134 (step S111).

When a job is not allocatable (No in step S111), the available node searching unit 141 adds +1 to the number of shifts and then determines whether or not a next shift for as many "0"s as the number of job shapes (x) is an upper limit of the rightward shift (step S118). When the next shift is the upper limit of the rightward shift (Yes in step S118), the available node searching unit 141 performs step S115. When the next shift is not the upper limit of the rightward shift (No in step S118), the available node searching unit 141 performs step S16. The description of the upper limit of the rightward shift which was given above is also true for this situation.

In step S111, when a job is allocatable (Yes in step S111), the available node searching unit 141 ends the y-direction loop of the job size in the job allocation information list (step S112). In particular, when the execution of the aforementioned loop range for the y direction of the job size does not end, the available node searching unit 141 repeats step S110, and when the execution of the aforementioned loop range for the y direction of the job size ends, the available node searching unit 141 performs step S113.

Next, the available node searching unit 141 ends the z-direction loop of the job size in the job allocation information list (step S113). In particular, when the execution of the aforementioned loop range for the a direction of the job size does not end, the available node searching unit 141 repeats step S19, and when the execution of the aforementioned loop range for the z direction of the job size ends, the available node searching unit 141 performs step S114.

Subsequently, the available node searching unit 141 determines whether or not the entirety of the request shape 6 of the job in FIG. 6 is allocatable (step S114). When the entirety of the request shape 6 of the job in FIG. 6 is allocatable, the available node searching unit 141 performs step S117.

When the entirety of the request shape 6 of the job in FIG. 6 is not allocatable, the available node searching unit 141 ends the y-direction loop of the computation node group 3 (step S115). In particular, when the execution of the aforementioned loop range for the y direction of the computation node group 3 does not end, the available node searching unit 141 repeats step S13. When the execution of the aforementioned loop range for the y direction of the computation node group 3 ends, the available node searching unit 141 performs step S116.

Next, the available node searching unit 141 ends the z-direction loop of the computation node group 3 (step S116). In particular, when the execution of the aforementioned loop range for the z direction of the computation node group 3 does not end, the available node searching unit 141 repeats step S12. When the execution of the aforementioned loop range for the z direction of the computation node group 3 ends, the available node searching unit 141 performs step S117.

Next, the available node searching unit 141 ends the loop of the job allocation information list (step S117). In particular, the available node searching unit 141 checks whether or not the current job allocation information list is the final list; when the current job allocation information list is not the final list, the available node searching unit 141 repeats step S11, and, when the current job allocation information list is the final list, the available node searching unit 141 ends the process. In this case, the available node searching unit 141 sets the job shape (x) of the search information 133' as a shape (x) of the job allocation information of the job allocation information 132', sets the job shape (y) of the search information 133' as a job shape (y) of the job allocation information of the job allocation information 132', and sets the job shape (z) of the search information 133' as a shape (z) of the job allocation information of the job allocation information 132'. The available node searching unit 141 sets "allocatable (true)" for an allocatable flag of the job allocation information 132'.

FIG. 11 illustrates an example of an effect of decreasing of the number of loops.

In FIG. 11, let the z-direction size of the computation node group 3 be "systemZ", let the y-direction size be "systemY", and let the x-direction size be "systemX". Moreover, let the z-direction job size be "jobZ", the y-direction job size be "jobY", and let the x-direction job size be "jobX".

In this case, according to the process illustrated in FIG. 16, the number of z-direction loops of the computation node group 3 is "systemZ−jobZ+1", the number of y-direction loops is "systemY−jobY+1", and the number of x-direction loops is "systemX−jobX+1". Moreover, the number of z-direction loops of the job size is "jobX", the number of y-direction loops of the job size is "jobY", and the number of x-direction loops of the job size is "jobX".

By contrast, according to the process illustrated in FIG. 10, the number of z-direction loops of the computation node group 3 is "systemZ−jobZ+1" and the number of y-direction loops is "systemY−jobY+1", but the number of x-direction loops is "1". Moreover, the number of z-direction loops of the job size is "jobZ" and the number of y-direction loops of the job size is "jobY", but the number of x-direction loops of the job size is "1".

Assume that the three-dimensional mesh connection in FIG. 2A has a cubic shape and that the job size in FIG. 6 also has a cubic shape. In this case, since "systemZ=systemY=systemX", these values will be indicated as "system". Since "jobZ=jobY=jobX", these values will be indicated as "job". Accordingly, the number of loops may be decreased as indicated by the following formula.

$$\frac{\text{The\_Example\_of\_FIG. 10}}{\text{The\_Example\_of\_FIG. 16}} = \frac{(\text{job}(\text{system}-\text{job}+1))^2}{(\text{job}(\text{system}-\text{job}+1))^3} = \frac{1}{\text{job}(\text{system}-\text{job}+1)}$$

Second Embodiment

In the first embodiment, the shift process of shifting the search mask pattern 134 is performed bit by bit. Referring to FIGS. 8A-8E and FIGS. 9A-9D, the number of computation nodes that is smaller than the number of computation nodes 31 required by a job is the same as the number of bits of shifts that are made until an available node 31 is detected. In other words, the number of bits with operation result "0" is the same as the smallest necessary shift amount to detect an available node 31.

Accordingly, in this example, the available node searching unit 141 calculates, for the x axis, the number of bits with operation result "0" according to an OR operation with x-axis search information 131' and the search mask pattern 134. The number of bits with operation result "0" is the number of bits indicating that a job is not allocatable. In addition, the available node searching unit 141 shifts consecutive bits of the search mask pattern 134 that are set as value "0" in the direction of bit0 as many times as the number of bits with operation result "0".

As a result, the shifted search mask pattern 134 is obtained. After this, the available node searching unit 141 again searches for an available node 31 by performing an OR operation with the x-axis search information 131' and the shifted search mask pattern 134. Accordingly, the shift process for bits with operation result "0" is performed in one action, i.e., the number of arithmetic processes may be decreased via skipping.

FIGS. 12A-12E and FIGS. 13A-13B illustrate another example of a determination for job allocation.

As an example, in x-axis search information 131D, assume that bit7 to bit5 are "0", bit4 to bit2 are "1", and bit1 to bit0 are "0", as illustrated in FIG. 12A. This indicates that the computation nodes 31 that correspond to bit7 to bit5 are in use, the computation nodes 31 that correspond to bit4 to bit2 are available, and the computation nodes 31 that correspond to bit1 to bit0 are in use.

As another example, in a search mask pattern 134F, assume that bit7 to bit5 are "0" and bit4 to bit0 are "1", as illustrated in FIG. 12B. This indicates that the computation nodes 31 that correspond to bit7 to bit5 are objects of an allocation request, and the computation nodes 31 that correspond to bit4 to bit0 are unrelated to the allocation and are thus ignorable.

The available node searching unit 141 determines a logical sum of the x-axis search information 131D in FIG. 12A and the search mask pattern 134F in FIG. 12B. The operation result of the logical sum indicates that bit7 to bit5 are "0" and bit4 to bit0 are "1" as illustrated in FIG. 12C. Thus, bit7 to bit5 need to be unallocatable, and bit4 to bit0 need to be allocatable.

As described above, the computation nodes 31 that correspond to bit7 to bit5 are objects of the allocation request, and the computation nodes 31 that correspond to bit4 to bit0 are unrelated to the allocation. As a result, a job is not allocatable to the computation nodes 31 that correspond to bit7 to bit5 and that are objects of the allocation request.

Accordingly, the available node searching unit 141 calculates the number of bits "0" in an operation result of a logical sum of the x-axis search information 131D in FIG. 12A and the search mask pattern 134F in FIG. 12B. The number of bits with operation result "0" is "3" as illustrated in FIG. 12C. The number of bits with operation result "0" is the "total number of shifts". The calculated total number of shifts is set as the total number of shifts of the search information 133' in FIG. 3D.

The total number of shifts is calculated as follows. As an example, in an operation result of a logical sum of x-axis search information 131D and the search mask pattern 134F, "bit5" is a position at which "0" initially emerges on a path directed to the leftmost bit bit7. In other words, "bit5" is located at the rightmost position from among positions at which "0" emerges. In this case, the total number of shifts may be determined in accordance with "size of the computation node group 3−rightmost position from among positions at which "0" emerges". Thus, since 8−5=3, the total number of shifts is "3".

According to the result of the calculation, the available node searching unit 141 shifts, in the direction of bit0 by three bits but not by one bit, the consecutive bits bit7 to bit5 of the search mask pattern 134 in FIG. 12B that correspond to size "3" requested by the job. As a result, a search mask pattern 134G in FIG. 12D is obtained.

After the three-bit shift process on the search mask pattern 134F is performed, the available node searching unit 141 again searches for an available node 31 by determining a logical sum with x-axis search information 131' and the shifted search mask pattern 134G.

The operation result of the logical sum of the x-axis search information 131B in FIG. 12A and the search mask pattern 134G in FIG. 12D indicates that bit7 to bit0 are "1" as illustrated in FIG. 12E. Thus, bit7 to bit0 need to indicate "allocatable".

As described above, the computation nodes 31 that correspond to bit7 to bit5 are objects of the allocation request, and the computation nodes 31 that correspond to bit4 to bit0 are unrelated to the allocation. As a result, a job is allocatable to the computation nodes 31 that correspond to bit7 to bit5 and that are objects of the allocation request.

Accordingly, in the process of allocating a job in a consecutive cuboid shape, the number of times the shift process on the search mask pattern 134 is performed and the number of times an OR operation is performed may be decreased. Thus, the time required to wait for execution of an entered job may be shortened, and the rate of operation of the computation node group 3 may be enhanced.

In some cases, the computation node group 3 is the torus-connected computer network illustrated in FIG. 2B. In this case, in a search mask pattern 134H, bit7 to bit3 may be "1", bit2 to bit0 may be "0", and the number of bits with operation result "0" may be "3" as illustrated in FIG. 13A. In other words, the sum of the total number of shifts and the x-direction job size requested by the job may be equal to or greater than the x-axis direction size of the computation node group 3.

In this case, the consecutive bits bit2 to bit0 that correspond to size "3" requested by the job are shifted by three bits in the direction of bit0. In this case, since bit7 is adjacent to bit0, the available node searching unit 141 moves "0"s of bit0 to bit7 as illustrated in FIG. 13B. As a result, bits with operation result "0" may be shifted.

Also in another embodiment, when the computation node group 3 is the torus-connected computer network illustrated in FIG. 2B, bits with operation result "0" are shifted as illustrated in FIGS. 13A-13B.

Figure 14:
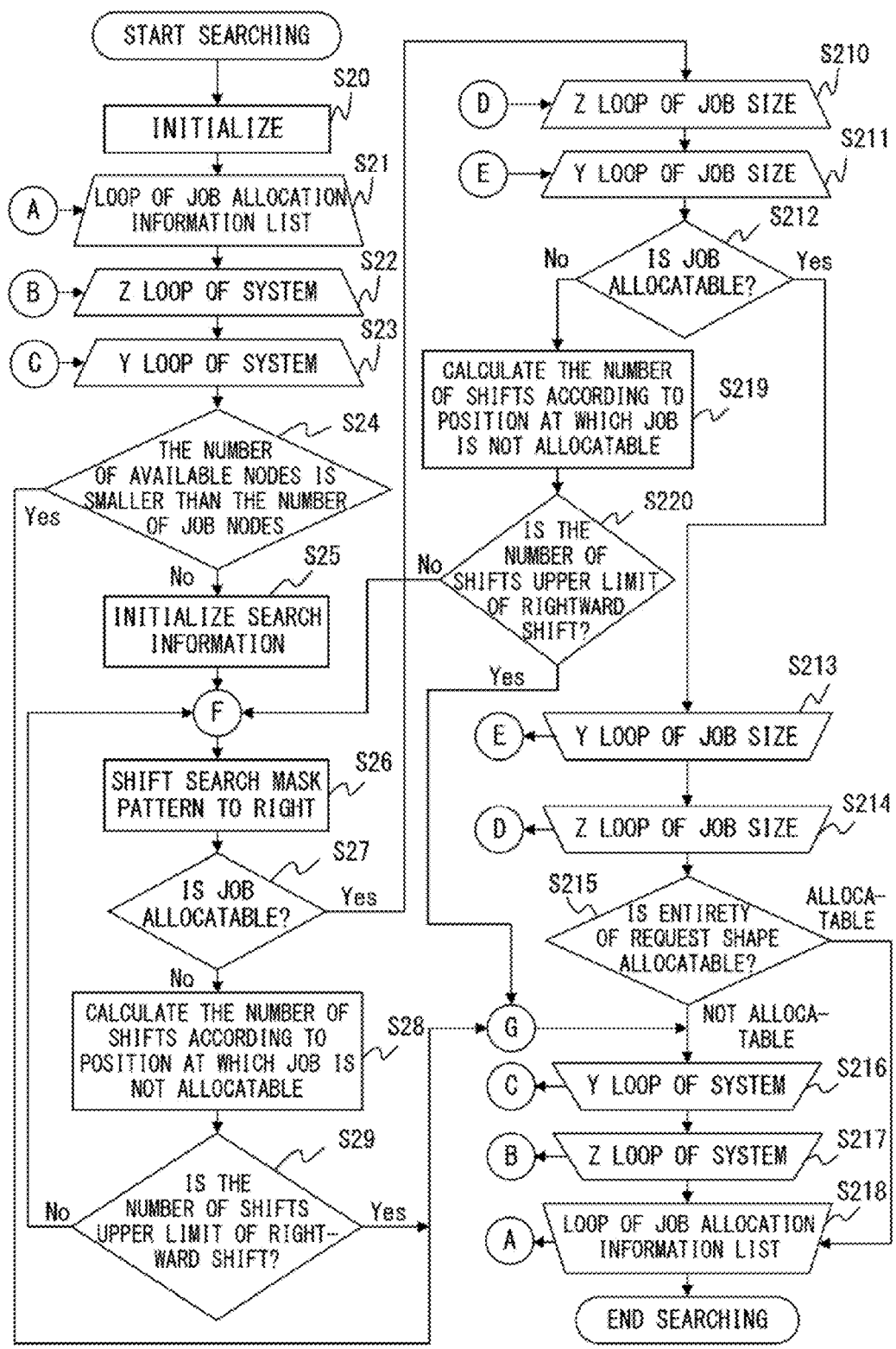
FIG. 14 illustrates a flow of another job management process.

FIG. 14 illustrates a flow of another job management process.

The available node searching unit 141 basically performs processes similar to those in FIG. 10 as illustrated in FIG. 14, but the available node searching unit 141 performs steps S28 and S219 in addition to the processes in FIG. 10.

In the following, differences will be described between the processes illustrated in FIG. 14 and those illustrated in FIG. 10.

As with steps S10 to S17 in FIG. 10, the available node searching unit 141 performs steps S20 to S27.

After this, when a job is not allocatable in step S27 (No in step S27), the available node searching unit 141 calculates the number of shifts according to a position at which a job is not allocatable (step S28). In particular, the available node searching unit 141 calculates the number of bits with operation result "0".

Subsequently, according to the number of bits with operation result "0" as well as x-axis search information 131' or the number of bits of the search mask pattern 134, the available node searching unit 141 determines whether or not as many shifts as the number of bits with operation result "0" is an upper limit of the rightward shift (step S29). In other words, it is determined whether or not the consecutive bits that correspond to the size "3" requested by the job can be shifted as many times as the number of bits with operation result "0".

When as many shifts as the number of bits with operation result "0" is not the upper limit of the rightward shift (No in step S29), the available node searching unit 141 performs step S26. Accordingly, the consecutive bits that correspond to size "3" requested by the job are shifted as many times as the number of bits with operation result "0".

When as many shifts as the number of bits with operation result "0" is the upper limit of the rightward shift (Yes in step S29), the available node searching unit 141 performs step S216.

Meanwhile, when a job is allocatable in step S27 (Yes in step S27), the available node searching unit 141 performs steps S210 to S212.

After this, when a job is not allocatable in step S212 (No in step S212), the available node searching unit 141 calculates the number of shifts according to a position at which a job is not allocatable (step S219). In particular, the available node searching unit 141 calculates the number of bits with operation result "0".

Subsequently, according to the number of bits with operation result "0" as well as x-axis search information 131' or the number of bits of the search mask pattern 134, the available node searching unit 141 determines whether or not as many shifts as the number of bits with operation result "0" is an upper limit of the rightward shift (step S220). In other words, it is determined whether or not the consecutive bits that correspond to size "3" requested by the job can be shifted as many times as the number of bits with operation result "0".

When as many shifts as the number of bits with operation result "0" is not the upper limit of the rightward shift (No in step S220), the available node searching unit 141 performs step S26. Accordingly, the consecutive bits that correspond to size "3" requested by the job are shifted as many times as the number of bits with operation result "0".

When as many shifts as the number of bits with operation result "0" is the upper limit of the rightward shift (Yes in step S220), the available node searching unit 141 performs step S216.

Third Embodiment

In the first and second embodiments, x-axis search information 131' is generated, and a double loop related to the x axis is reduced. Meanwhile, when, for example, the size of the computation node group 3 is small, the number of times a shift process is performed on the search mask pattern 134 is decreased. In this case, the overhead of a generating process of generating x-axis search information 131', an OR operation process of computing a logical sum of the x-axis search information 131' and the search mask pattern 134, and a shift process on the search mask pattern 134 may become large.

In this example, accordingly, when the x-axis size of the computation node group 3, i.e., the maximum value of [systemX], is equal to or greater than a preset first value, the available node searching unit 141 performs a shift process of shifting consecutive bits in the search mask pattern 134 according to a result of a logic operation as described above. The x-axis size of the computation node group 3 is the maximum value of [systemX]. The first value is empirically preset. When y-axis search information or z-axis search information is generated and the y-axis size or the z-axis size is equal to or greater than a preset value, a shift process of shifting consecutive bits in the search mask pattern 134 is performed according to a result of a logic operation.

Meanwhile, when the x-axis size of the computation node group 3 is less than the preset first value, the available node searching unit 141 searches for an available node 31 by further repeating, for the x axis, a determining process of determining whether or not a node is an available node 31 in a preset order starting from a start point. In other words, when the x-axis size of the computation node group 3 is less than the preset first value, the available node searching unit 141 executes the x-axis loop of the computation node group 3.

This may prevent the overhead of the shift process on the search mask pattern 134 from being increased.

When the x-axis direction size requested by a job is equal to or greater than a preset second value, the available node searching unit 141 may shift consecutive bits in the search mask pattern 134 according to a result of a logic operation. The x-axis direction size requested by the job is the maximum value of [jobX]. The second value is empirically preset. When y-axis search information or z-axis search information is generated and the y-axis size or the z-axis size requested by the job is equal to or greater than a preset value, a shift process of shifting consecutive bits in the search mask pattern 134 may be performed according to a result of a logic operation.

When a difference between the x-axis size of the computation node group 3 and the size requested by the job is equal to or greater than a preset third value, the available node searching unit 141 may shift consecutive bits in the search mask pattern 134 according to a result of a logic operation. The third value is empirically preset. When y-axis search information or z-axis search information is generated and the difference in the y-axis direction or the difference in the z-axis direction is equal to or greater than a preset value, a shift process of shifting consecutive bits in the search mask pattern 134 may be performed according to a result of a logic operation.

Fourth Embodiment

In the first to the third embodiments, the x axis is selected as one of the three dimensions, x-axis search information 131' is generated, and the double loop related to the x axis is reduced. Meanwhile, in the case of the computation node group 3 that has a cubic shape, applying a reduced loop to an axis direction with a greater size increases the effect of shortening a processing time that is achieved via the reduction in the loop. Also in the case of a request shape of a job that has a cubic shape, applying a reduced loop to an axis direction with a greater size increases the effect of shortening a processing time that is achieved via the reduction in the loop.

Accordingly, in this example, the computation node management unit 142 selects, as one of n dimensions, a dimension that is the longest side of the computation node group 3 in FIG. 2A and generates search information of the selected axis. Note that the longest side is a coordinate axis having the highest value from among the maximum value of [systemX], the maximum value of [systemY], and the maximum value of [systemS]. In other words, the computation node management unit 142 rotates the computation node group 3 in FIG. 2A without changing the coordinate axes, in such a manner that the x axis becomes the dimension that is the longest side of the computation node group 3.

Under this condition, the computation node management unit 142 allocates a job to the computation node group 3. After this, the computation node management unit 142 rotates the computation node group 3 in FIG. 2A backward without changing the coordinate axes, in such a manner that the dimension that is the longest side of the computation node group 3 is converted from the x axis back into the original coordinate axis. Subsequently, the job execution controlling unit 12 allocates the job to the computation node group 3 with the original coordinate axes and causes the computation node group 3 to execute the job. Accordingly, the time required to perform a job allocating process may be further shortened.

The computation node management unit 142 may select, as one of n dimensions, a dimension that is the longest side of the request shape 6 of the job in FIG. 6 and may generate search information of the selected axis. Note that the longest side is a coordinate axis having the highest value from among the maximum value of [jobX], the maximum value of [jobY], and the maximum value of [jobZ]. In other words, the computation node management unit 142 rotates the computation node group 3 in FIG. 2A without changing the coordinate axes, in such a manner that the x axis becomes the dimension that is the longest side of the request shape 6 of the job in FIG. 6.

In this condition, the computation node management unit 142 allocates a job to the computation node group 3. After this, the computation node management unit 142 rotates the computation node group 3 in FIG. 2A backward without changing the coordinate axes, in such a manner that the dimension that is the longest side of the request shape 6 of the job in FIG. 6 is converted from the s axis back into the original coordinate axis. Subsequently, the job execution controlling unit 12 allocates the job to the computation node group 3 with the original coordinate axes and causes the computation node group 3 to execute the job. Accordingly, the time required to perform a job allocating process may be further shortened.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A job management apparatus that searches for an available node which is a computation node in an n-dimensional mesh-connected or n-dimensional torus-connected computer network, wherein n is an integer that is two or higher, and to which a job is allocatable, the job management apparatus comprising:

a one-dimensional search information generating unit configured to generate one-dimensional search information, which is search information related to one dimension of n dimensions, which includes a plurality of bits, and which indicates, using one-bit information, whether or not the job is allocatable for each of a plurality of computation nodes belonging to the one dimension of the n dimensions;

a search information generating unit configured to generate a search mask pattern with as many bits as corresponds to the plurality of bits, the search mask pattern including consecutive bits that correspond to a size required by the job in relation to the one dimension of the n dimensions and that are set to a preset value;

an available node searching unit configured to search for the available node by performing, for the one dimension of the n dimensions, a preset logic operation with the one-dimensional search information and the search mask pattern, wherein:

when a result of the logic operation for the one dimension of the n dimensions indicates that the job is not allocatable for the one dimension of the n dimensions, the available node searching unit searches for the available node by shifting, in a preset direction by one bit, the consecutive bits that are included in the search mask pattern and that are set to the preset value, performing the preset logic operation with the one-dimensional search information and the shifted search mask pattern, calculating the number of bits that indicate that the job is not allocatable according to the logic operation for the one dimension of the n dimensions, shifting the consecutive bits that are included in the search mask pattern and that are set to the preset value in the preset direction as many times as the number of bits that indicate that the job is not allocatable, and performing the preset logic operation with the one-dimensional search information and the shifted search mask pattern; and an allocating unit that allocates, based on when the result of the preset logic operation indicates the job can be allocated, the job to the plurality of computation nodes.

2. The job management apparatus according to claim 1, wherein for remaining dimensions other than the one dimension of the n dimensions, wherein the remaining dimensions are described as n−1, the available node searching unit searches for the available node by repeating a determining process of determining whether or not a node is the available node in a preset order starting from a start point.

3. The job management apparatus according to claim 1, further comprising:

a computation node management unit configured to generate n-dimensional-system information indicating whether or not a node is the available node for each of the computation nodes in the n-dimensional mesh-connected or n-dimensional torus-connected computer network, wherein the available node searching unit generates the one-dimensional search information according to the n-dimensional-system information.

4. The job management apparatus according to claim 1, further comprising:

a computation node management unit configured to select, as the one dimension of the n dimensions, a dimension that is a longest side of the n-dimensional mesh-connected or n-dimensional torus-connected computer network.

5. A job management apparatus that searches for an available node which is a computation node in an n-dimensional mesh-connected or n-dimensional torus-connected computer network, wherein n is an integer that is two or higher, and to which a job is allocatable, the job management apparatus comprising:

a one-dimensional search information generating unit that generates one-dimensional search information, which is search information related to one dimension of n dimensions, which includes a plurality of bits, and which indicates, using one-bit information, whether or not the job is allocatable for each of a plurality of computation nodes belonging to the one dimension of the n dimensions;

a search information generating unit that generates a search mask pattern with as many bits as corresponds to the plurality of bits, the search mask pattern including consecutive bits that correspond to a size required by the job in relation to the one dimension of the n dimensions and that are set to a preset value;

an available node searching unit that searches for the available node by performing, for the one dimension of the n dimensions, a preset logic operation with the one-dimensional search information and the search mask pattern, wherein:

when a result of the logic operation for the one dimension of the n dimensions indicates that the job is not allocatable for the one dimension of the n dimensions, the available node searching unit searches for the available node by shifting, in a preset direction by one bit, the consecutive bits that are included in the search mask pattern and that are set to the preset value, and performing the preset logic operation with the one-dimensional search information and the shifted search mask pattern; and the available node searching unit shifts the consecutive bits in the search mask pattern according to the result of the logic operation when a size of the n-dimensional mesh-connected or n-dimensional torus-connected computer network is equal to or greater than a preset first value, when a size requested by the job is equal to or greater than a preset second value, or when a difference between the size of the computer network and the size requested by the job is equal to or greater than a preset third value; and an allocating unit that allocates, based on when the result of the preset logic operation indicates the job can be allocated, the job to the plurality of computation nodes.

6. A job management method for searching for an available node which is a computation node in an n-dimensional mesh-connected or n-dimensional torus-connected computer network, wherein n is an integer that is two or higher, and to which a job is allocatable, the job management method comprising:

generating, by a one-dimensional search information generating unit, one-dimensional search information, which is search information related to one dimension of n dimensions, which includes a plurality of bits, and which indicates, using one-bit information, whether or not the job is allocatable for each of a plurality of computation nodes belonging to the one dimension;

generating, by a search information generating unit, a search mask pattern with as many bits as corresponds to the plurality of bits, the search mask pattern including consecutive bits that correspond to a size required by the job in relation to the one dimension of the n dimensions and that are set to a preset value; and searching for, by an available node searching unit, the available node by performing, for the one dimension of the n dimensions, a preset logic operation with the one-dimensional search information and the search mask pattern, wherein:

when a result of the logic operation for the one dimension of the n dimensions indicates that the job is not allocatable for the one dimension of the n dimensions, the available node is searched, by the available node searching unit, by shifting, in a preset direction by one bit, the consecutive bits that are included in the search mask pattern and that are set to the preset value, performing the preset logic operation with the one-dimensional search information and the shifted search mask pattern, calculating the number of bits that indicate that the job is not allocatable according to the logic operation for the one dimension of the n dimensions, shifting the consecutive bits that are included in the search mask pattern and that are set to the preset value in the preset direction as many times as the number of bits that indicate that the job is not allocatable, performing the preset logic operation with the one-dimensional search information and the shifted search mask pattern; and an allocating unit that allocates, based on when the result of the preset logic operation indicates the job can be allocated, the job to the plurality of computation nodes.

* * * * *